United States Patent
Wood et al.

(10) Patent No.: US 12,502,817 B1
(45) Date of Patent: *Dec. 23, 2025

(54) ADJUSTING INJECTION PRESS PARAMETERS ACROSS A FLEET BASED ON SENSOR READINGS FROM ATTACHABLE MONITORING DEVICES

(71) Applicant: SyBridge Technologies U.S. Inc., Southfield, MI (US)

(72) Inventors: Charles David Wood, Highland Park, IL (US); Quinn Fitzgerald Gaughan, Chicago, IL (US); William Paul King, Champaign, IL (US); Neil Thomas Jobin, Tecumseh (CA)

(73) Assignee: SyBridge Technologies U.S. Inc., Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/208,937

(22) Filed: May 15, 2025

Related U.S. Application Data

(63) Continuation of application No. 18/821,475, filed on Aug. 30, 2024, now Pat. No. 12,330,360.

(51) Int. Cl.
  *B29C 45/76* (2006.01)

(52) U.S. Cl.
  CPC .. *B29C 45/768* (2013.01); *B29C 2945/76163* (2013.01); *B29C 2945/76949* (2013.01)

(58) Field of Classification Search
  CPC ........ B29C 45/768; B29C 2945/76163; B29C 2945/76949; B29C 45/76; B29C 45/766
  See application file for complete search history.

(56) References Cited

U.S. PATENT DOCUMENTS

| | | | | |
|---|---|---|---|---|
| 6,036,466 | A * | 3/2000 | Bayer | B29C 45/76 425/155 |
| 2007/0284774 | A1* | 12/2007 | Sandoval | B29C 45/76 264/169 |
| 2007/0293977 | A1* | 12/2007 | Galt | B29C 45/768 700/204 |
| 2008/0021678 | A1* | 1/2008 | Grimm | G06Q 10/06 717/123 |

(Continued)

FOREIGN PATENT DOCUMENTS

JP  2012076427 A * 4/2012

*Primary Examiner* — Alicia M. Choi
(74) *Attorney, Agent, or Firm* — McDonnell Boehnen Hulbert & Berghoff LLP

(57) ABSTRACT

The present disclosure relates to attachable monitoring devices for molding tools. One example embodiment includes a method. The method includes receiving, by a first computing device and from a monitoring device that includes a plurality of sensors, a plurality of sensor readings associated with operation of an injection press or with a mold usable by the injection press. The plurality of sensor readings were collected by the monitoring device when the monitoring device was attached to an exterior of the mold. The method also includes determining, by the first computing device, one or more metrics associated with a state of the injection press or a state of the mold. Determining the one or more metrics includes applying a machine-learned model to the plurality of sensor readings. Further, the method includes providing, by the first computing device to a second computing device, the one or more metrics.

20 Claims, 17 Drawing Sheets

(56) References Cited

U.S. PATENT DOCUMENTS

| | | | | |
|---|---|---|---|---|
| 2014/0037779 | A1* | 2/2014 | Olaru | B29C 45/76 |
| | | | | 425/135 |
| 2015/0106912 | A1* | 4/2015 | Brandon | H04Q 9/00 |
| | | | | 726/13 |
| 2017/0015029 | A1* | 1/2017 | Altonen | B29C 45/766 |
| 2018/0272491 | A1* | 9/2018 | Yang | B23Q 17/0971 |
| 2019/0342638 | A1* | 11/2019 | Samkowiak | B21D 22/02 |
| 2020/0001511 | A1* | 1/2020 | Burns | B29C 45/7693 |
| 2020/0230857 | A1* | 7/2020 | Bonada Bo | B29C 45/76 |
| 2022/0134622 | A1* | 5/2022 | Tsukada | B29C 45/76 |
| | | | | 264/40.1 |
| 2023/0234272 | A1* | 7/2023 | Burns | B29C 45/768 |
| | | | | 264/40.4 |
| 2024/0140011 | A1* | 5/2024 | Nakazono | B29C 45/766 |
| 2024/0169325 | A1* | 5/2024 | Ravi | G06Q 10/20 |

* cited by examiner

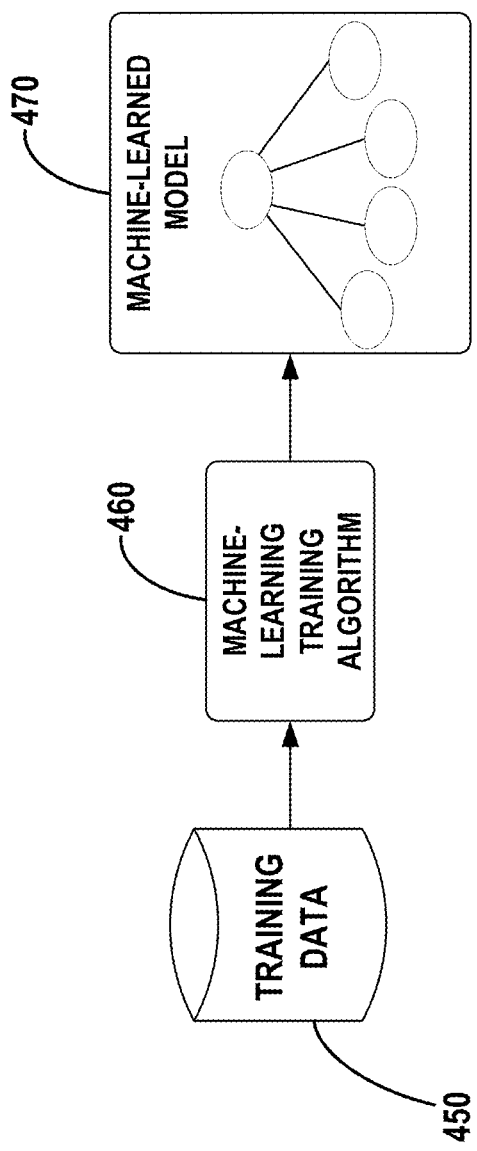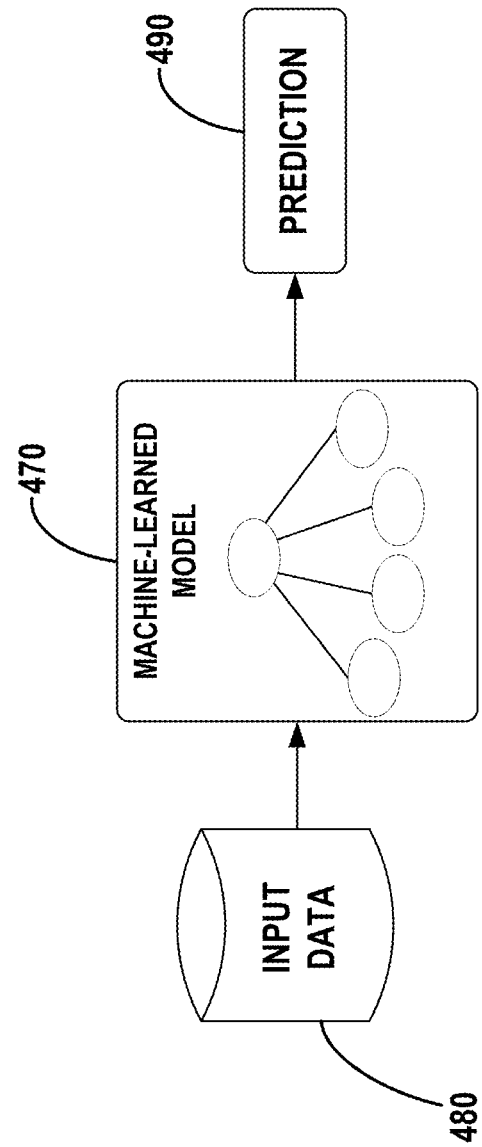

FIG. 5A

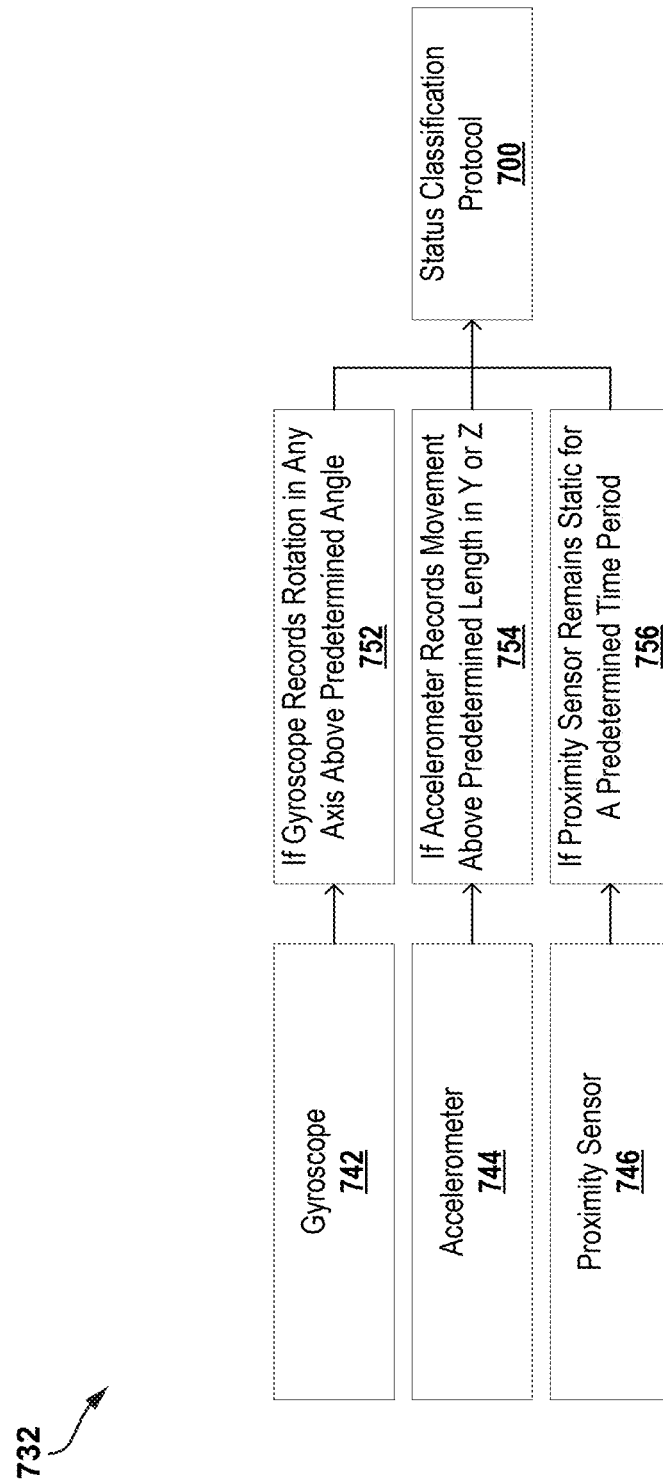

ADJUSTING INJECTION PRESS PARAMETERS ACROSS A FLEET BASED ON SENSOR READINGS FROM ATTACHABLE MONITORING DEVICES

CROSS-REFERENCE TO RELATED APPLICATIONS

The present application is a continuation application claiming priority to U.S. patent application Ser. No. 18/821,475, filed Aug. 30, 2024. The contents of U.S. patent application Ser. No. 18/821,475, filed Aug. 30, 2024; U.S. Pat. App. No. 63/277,971, filed Nov. 10, 2021; U.S. patent application Ser. No. 18/708,966, filed May 9, 2024; and Int. Pat. App. No. PCT/US2022/049539, filed Nov. 10, 2022 are hereby incorporated by reference in their entireties.

BACKGROUND

Injection molding is a technique often used to manufacture parts in high volume. The process generally involves using an injection molding press to inject a liquefied material into an injection mold configured to receive the liquefied material and for forming into a part defined by the shape and design of the mold.

Once the injection mold is filled, a holding pressure is maintained while the liquefied material hardens into a part formed by the shape of cavities of the injection mold. Once the liquefied material hardens sufficiently, the mold is opened and the part is separated from the mold.

SUMMARY

The specification and drawings disclose embodiments that relate to attachable monitoring devices for molding tools. For example, the monitoring devices described herein may be attachable to an exterior of a mold and/or an exterior of an associated injection press. Such monitoring devices may include an array of sensors, such as thermocouple(s), strain gauge(s), inertial measurement unit(s) (IMUs), humidity sensor(s), accelerometer(s), and distance sensor(s). The array of sensors may be used to monitor the operation of an injection press and/or a mold (e.g., a mold that can be used in the injection press) by collecting one or more sensor readings. Thereafter, the sensor readings may be used to determine one or more metrics about the mold and/or the injection press (e.g., by applying a machine-learning model to the sensor readings). Such metrics could be used to identify whether the mold and/or the injection press require servicing, replacement, obtaining of replacement parts, etc. Hence, the metrics may be provided to an owner of the mold and/or the injection press (e.g., via a browser-based user interface). Based on the metrics, one or more actions may be taken with respect to the mold and/or the injection press (e.g., a user of the browser-based user interface may initiate obtainment of replacement parts for one or more molds, initiate obtainment of replacement molds, redirect obtainment of additional molds, recalculate a production timeline associated with one or more molds, etc.).

In a first aspect, the disclosure describes a method. The method includes receiving, by a first computing device and from a monitoring device that includes a plurality of sensors, a plurality of sensor readings associated with operation of an injection press or with a mold usable by the injection press. The plurality of sensors includes a thermocouple, a strain gauge, an inertial measurement unit, a humidity sensor, an accelerometer, and a distance sensor. The plurality of sensor readings were collected by the monitoring device when the monitoring device was attached to an exterior of the mold. The method also includes determining, by the first computing device, one or more metrics associated with a state of the injection press or a state of the mold. Determining the one or more metrics includes applying a machine-learned model to the plurality of sensor readings. Additionally, the method includes providing, by the first computing device to a second computing device, the one or more metrics.

In a second aspect, the disclosure describes a monitoring device. The monitoring device includes a plurality of sensors configured to collect a plurality of sensor readings associated with operation of an injection press or with a mold usable by the injection press. The plurality of sensors includes a thermocouple, a strain gauge, an inertial measurement unit, a humidity sensor, an accelerometer, and a distance sensor. The plurality of sensors is configured to collect the plurality of sensor readings when the monitoring device is attached to an exterior of the mold. The monitoring device also includes a controller configured to provide the plurality of sensor readings to a first computing device. The first computing device is configured to determine one or more metrics associated with a state of the injection press or a state of the mold. Determining the one or more metrics includes applying a machine-learned model to the plurality of sensor readings. The first computing device is also configured to provide the one or more metrics to a second computing device.

In a third aspect, the disclosure describes a system. The system includes a mold usable by an injection press. The system also includes a first computing device. Additionally, the system includes a monitoring device attached to the mold. The monitoring device includes a plurality of sensors configured to collect a plurality of sensor readings associated with operation of the injection press or with the mold. The plurality of sensors includes a thermocouple, a strain gauge, an inertial measurement unit, a humidity sensor, an accelerometer, and a distance sensor. The plurality of sensors is configured to collect the plurality of sensor readings when the monitoring device is attached to an exterior of the mold. The monitoring device also includes a controller configured to provide the plurality of sensor readings to the first computing device. The first computing device is configured to determine one or more metrics associated with a state of the injection press or a state of the mold. Determining the one or more metrics includes applying a machine-learned model to the plurality of sensor readings. The first computing device is also configured to provide the one or more metrics to a second computing device.

In a fourth aspect, the disclosure describes a method. The method includes receiving, by a first computing device and from an array of acoustic sensors, a plurality of sensor readings associated with operation of an injection press or with a mold usable by the injection press. The plurality of sensor readings were collected by the array of acoustic sensors when array of acoustic sensors were arranged in an interior of the mold. The method also includes determining, by the first computing device, one or more metrics associated with a state of the injection press or a state of the mold. Determining the one or more metrics includes applying a machine-learned model to the plurality of sensor readings. Additionally, the method includes providing, by the first computing device to a second computing device, the one or more metrics.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4B is an illustration of a method for training a machine-learned model, according to example embodiments.

FIG. 4C is an illustration of a method of making a prediction using a machine-learned model, according to example embodiments.

FIG. 5A is an illustration of a user dashboard associated with an application (e.g., a browser-based app or a mobile app), according to example embodiments.

FIG. 7B is an illustration of a sensor activation protocol, according to example embodiments.

DETAILED DESCRIPTION

Figure 1:
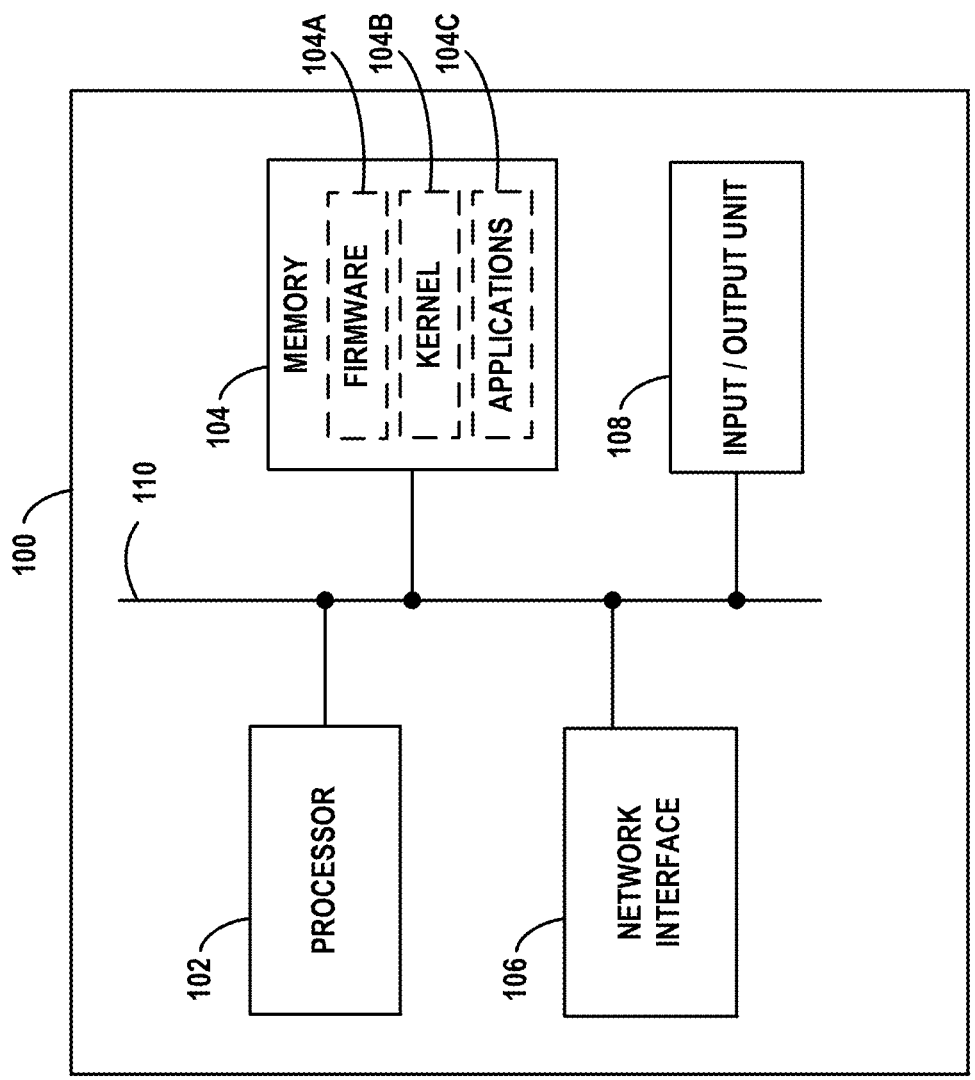
FIG. 1 is a block diagram illustration of a computing device, according to example embodiments.

Example methods and systems are described herein. Any example embodiment or feature described herein is not necessarily to be construed as preferred or advantageous over other embodiments or features. The example embodiments described herein are not meant to be limiting. Certain aspects of the disclosed systems and methods can be arranged and combined in a wide variety of different configurations, all of which are contemplated herein.

Furthermore, the particular arrangements shown in the figures should not be viewed as limiting. Other embodiments might include more or less of each element shown in a given figure. In addition, some of the illustrated elements may be combined or omitted. Similarly, an example embodiment may include elements that are not illustrated in the figures.

I. Overview

Example embodiments relate to attachable monitoring devices for molding tools. Such monitoring devices can be used in conjunction with machine-learned models and/or user interfaces to provide metrics on fleets of molds and/or associated injection presses. These metrics, in turn, can be used to tune future injection molding processes across a fleet (e.g., which molds to use, which injection presses to use, settings to use when performing an injection molding process, whether to repair or replace one or more molds and/or injection presses, etc.).

Injection molding techniques may be performed using an injection molding press (hydraulic, electric, or hybrid), a mold, plastic resin pellets, a material heater, a mold heater, a mold chiller, and a controller. An injection molding press (or "injection press" or simply "press") is a piece of equipment into which an injection mold may be installed. Further, the injection press may apply the appropriate amount of force to close the mold together, to heat up and melt the plastic resin to be injected, to inject the molten resin into the mold, and to open and close the mold to allow for ejection of molded parts.

An injection mold is a custom-made component responsible for producing the final geometry of a molded part. Injection molds may be assemblies of tens to thousands of components. In some cases, the injection mold may be two halves which, when mated together, leave an internal gap in the shape of the desired molded part. One half of the mold may be attached to the moving side of the injection press and the other half may be attached to the stationary side of the injection press. Each of these halves may be a combination of subassemblies. For example, the stationary half may include a runner system, heating channels, cooling channels, and the geometry cavity. The runner system may be responsible for guiding the molten plastic from an injection press's material tip to an internal gap where it will form the final molded part. Molten plastic may leave the injection press via a nozzle that interfaces with an orifice on the injection mold that is the start of the injection mold runner system. Heating channels may be machined channels for guiding water or solvent from the mold heater throughout the injection mold to bring the mold to a prescribed temperature. Cooling channels, on the other hand, may be machined channels for guiding water or solvent from the mold chiller throughout the mold to maintain the prescribed temperature. The geometry cavity may be an inverse negative of the desired geometry the mold is designed to produce in the molded part. The moving half may contain the ejection system, heating channels, cooling channels, and the geometry core.

The ejection system may be responsible for pushing the finished parts out of the mold. This system may include mechanical components (e.g., pins) that push the molded parts off, pneumatic components that use air to push the molded parts off, a robotic system that grabs the molded parts, or a combination of any or all these systems. The complexity of the ejection system is typically set based on the complexity of the desired part to be molded or based on the downstream sorting techniques used. The heating and cooling channels on the moving half may be similar to or the same as the previously described channels on the stationary half. The core assembly may be the negative of the final part geometry the mold is designed to produce.

The injection press can service a range of injection molds (e.g., one at a time) and can produce a range of part geometries in a range of materials. An injection mold is typically custom made for one specific part geometry and only capable of producing that specific part geometry. Injection molds may use different material types, but usually are designed for one material. Injection molds may also be referred to as an "injection tool" or simply a "tool."

The molding process may begin by heating plastic granules to a liquid state and then forcefully injecting the liquid plastic into a precisely shaped mold cavity. Once the plastic cools and solidifies, the mold is opened to eject the finished part, which retains the detailed contours of the mold. The full process loop may be referred to as a "shot" or a "cycle" and may include the mold being closed, the plastic being injected, the mold being opened, and a final part being ejected. The mold heater may be a separate piece of auxiliary equipment that warms the mold up to a set temperature. The mold heater may connect into the mold's internal water lines and feed heated water or solvent throughout the mold to bring the mold to temperature.

The mold chiller may be responsible for keeping the mold at a set temperature throughout the molding operation as the molten plastic would otherwise gradually heat the mold up to a temperature beyond the set temperature, which could lengthen the production time and degrade the final part quality. In the absence of the mold chiller, the molten plastic may gradually heat the mold up because the plastic is much hotter than the mold and the mold is in direct contact with the molten plastic which causes thermal transfer from the molten plastic to the mold. The mold chiller may be a separate piece of auxiliary equipment that connects into the mold's internal cooling lines and feeds chilled water or solvent throughout the mold to keep the mold at the set temperature. In some cases, the mold chiller is also connected to the injection press to help maintain the proper temperature points of the injection press (e.g., such as maintaining the proper temperature of an injection barrel of the injection press).

The mold heater and mold chiller may have a controller that allows the user to set the desired temperatures, pressures, and flow rates for the system. The desired temperatures may be specific to the mold design, material type, and production speed. The injection press may have a controller that enables the user to set control points for the entire injection molding process. The injection press controller may be responsible for controlling the temperatures of the barrel heater, the injection screw speed and distance, the clamp pressures, and the time of each step throughout the injection molding process, for example. The injection press controller may use a combination of the in-press sensors and motors to adhere to the set parameters.

At the end of an injection molding process, an ejection system may push the molded part out of the mold and drop it down to a bin or a conveyor belt. The ejection system can be pneumatic or physical where a pin pushes the part out or a robotic arm could grab the part off the core. This technique is highly efficient for mass production, as it allows for complex parts to be created with high repeatability and tight tolerances.

Notably, this description of injection molding is for purposes of illustration. The embodiments described herein may be applicable to numerous variations of this description, not limited to variations in the construction and material of the mold, the characteristics and/or molecular structure of the substance being molded, the heating and/or cooling procedures and equipment, the ejection system, and/or how the injection press and/or mold are controlled. Thus, the description above and as referenced below is merely for purposes of example and not limiting.

Injection molding can be a costly endeavor that requires a large upfront investment to purchase an injection mold; a qualified engineering team and facility with machinery to design, produce, and assemble the mold; and a well-operating molding facility with the injection presses, auxiliary equipment, and staff to produce consistent quality molded parts from the injection mold. Example embodiments herein address the industry challenge of reliably and efficiently monitoring injection molds (e.g., after they has been assembled, built, and begun producing molded parts). Such embodiments allow for real-time information about an injection mold's location, usage history, anomaly events, health, repair schedules, and warranty status. In order to provide such information, example embodiments may include a management platform for accessing information about a fleet of injection molds. While example embodiments described herein are described in the context of injection molding, similar techniques could equally be applied to other types of molding (e.g., blow molding, rotational molding, and compression molding).

In some embodiments, a monitoring device, a database, and a user interface (e.g., via a browser-based app or a mobile app) may be provided. The monitoring device may include a controller (e.g., mounted on a control board with on-board memory), a power source, a display, a housing, and a plurality of sensors (e.g., one or more thermocouples, one or more strain gauges, one or more IMUs, one or more humidity sensors, one or more accelerometers, and/or one or more acoustic sensors). The user interface may be provided on a display of a user's device (e.g., mobile device, tablet device, computer, etc.).

The monitoring device may: (1) be installed onto a mold, (2) collect sensor readings from the mold using the plurality of sensors, and (3) transmit data to the database (e.g., a cloud database). Next, a first computing device (e.g., a cloud-based computing device or a server device) may: (4) analyze the sensor readings to determine one or more metrics associated with a state of the injection press or of the mold and (5) present the one or metrics to a user via the user interface (e.g., in the form of graphs, reports, etc.). Thereafter, (6) the first computing device may determine one or more adjustments to the operation of the injection press, one or more modifications to the mold, or one or more changes in the production process (e.g., dispatching a service technician to perform maintenance, obtaining replacement parts, re-routing a delivery, scheduling production using a different injection press or fabrication facility, etc.). Such a determination may be based on the previously received sensor readings and/or based on the feedback received via the user interface (e.g., one or more commands or selections provided by a user via the user interface).

The user interface, information contained therein, and various actions available to the user may help the user to address various problems. Further, the user interface may provide some or all of the historic data collected from a mold, the results of one or more data analyses, and the history of mold usage. Some or all of these metrics and sensor readings may be used to monitor the production history to forecast future mold production. For example, sensor readings may be used to determine if a mold has declined in quality or function, which may inform future maintenance and repair work. The sensor readings may also be used to determine and track the movements of a mold's current and previous locations. Further, sensor readings may be used to check the status of a limited warranty (e.g., based on a number of injection mold processes performed or an age of the mold).

The monitoring device may be straightforwardly installed rather than requiring precisely machined cavities or connections to the injection press. For example, the monitoring device may not need to be removed when removing the mold from the injection press (e.g., as a result of the monitoring device's compact size and consolidated sensor array). Further, a monitoring device may be calibrated upon delivery, removing the need for a technician to set process boundaries during set up and installation. Additionally, the monitoring device may be moved to a different injection press without the need for recalibration, as the monitoring device may automatically detect when the monitoring device has changed injection presses (e.g., based on the sensor readings of the plurality of sensors). Once the monitoring device detects a move to a different injection press, any machine-learned models used by the first computing device to analyze the sensor readings may be reselected retrained (e.g., using additional sensor readings captured by the monitoring device on the new injection press) in order to accommodate the move to the new injection press.

In various embodiments, the monitoring device may include a number of different sensors and components. For example, in some embodiments, the monitoring device may include a housing, one or more power sources, one or more displays, one or more thermocouples, one or more strain gauges, one or more IMUs, one or more humidity sensors, one or more accelerometers, one or more distance sensors, etc. The power source(s) may include one or more batteries and one or more connections to power outlets. Batteries may allow the device to continue collecting and transmitting data even when the connections to the power outlets are disconnected, for example. The connections to power outlets may be the default power source and may be usable to recharge the one or more batteries. The one or more distance sensors may be used to determine the distance between two or more components of the mold that may move relative to each other during cycling. The temperature sensor(s) and/or humidity sensor(s) may record the environmental conditions in which the mold is operating. The thermocouple(s) may record the inner mold temperature. As such, in some embodiments, the thermocouple(s) may be positioned close to the injection site during an injection molding process. The strain gauge may record the deflection of the mold in order to enable calculation of the applied pressure on the mold during various injection mold phases (e.g., mold close, injection, hold, and cooling phases). The IMU may record tool movements, rotations, and vibrations. The various sensor readings may be collected continuously (e.g., at a rate of one measurement per second or ten measurements per second). Alternatively, the sensor readings may be collected according to a pre-determined schedule or when triggered by certain events or conditions. For example, temperature(s) may be measured by the thermocouple(s) only at specified points in an injection cycle. The display may provide operators of the injection press with a visual indication of various sensor readings and/or statuses associated with the monitoring device (e.g., power status, connectivity, and warnings).

In some embodiments, the user interface may provide a cloud interface with an online portal where users can log in and view a listing of some or all molds within their portfolio (e.g., within a fleet of molds). As such, the user interface may provide remote access and monitoring of the status of one or more molds. In some embodiments, the user interface may include a mold specific dashboard that provides a detailed analysis of a mold (e.g., based on one or more metrics determined by a server computing device based on one or more sensor readings). The dashboard may provide a viewable time window. The time window may be modifiable by a user, thereby allowing a user to filter to specific days or events. Further, the dashboard may indicate where one or more molds are located throughout the world in real-time. Additionally, the dashboard may provide historic temperature, strain, and/or vibration profile(s) of one or more molds. Yet further, the dashboard may provide a list of detected anomaly events and behavior changes of the mold. Still further, the dashboard may provide the status of one or more molds (e.g., if the molds are running, idle, or require maintenance). Even further, this dashboard may provide the historic cycle time of one or more molds (e.g., which may be used to ensure that the mold(s) are running as expected). Still yet further, the dashboard may provide the historic uptime of one or more molds (e.g., which may be used to ensure production schedules will be met). Even still further, the dashboard may provide the cycle counts, locations, statuses, temperatures, and/or cycle times of one or more molds in real-time.

In some embodiments, the server may also facilitate collaboration between members of one organization (e.g., a tool maker, a molder, and a part owner) or between members of different organizations. For example, a first user from a first organization may collaborate with a second user at a second organization by discussing historical trends, new issues, or future projections provided by the server via the user interface.

In some embodiments, the monitoring device may include firmware (e.g., installed in an on-board memory of a controller). The firmware may process the raw sensor readings, execute edge computing for sensor processing, and communicate the processed sensor readings to a server (e.g., a cloud server). The server may execute one or more routines stored within a non-transitory, computer-readable medium. For example, the server may execute an ingestion layer, a segmentation layer, an analysis layer, and a database layer. The ingestion layer may be used to ingest the raw sensor readings transmitted to the server. The ingestion layer may also be used to process the raw sensor readings and route them to their proper destination. The data segmentation layer may be used to separate the sensor readings in a variety of ways depending on the downstream algorithm requirements. For example, the segmentation layer may slice the same sensor readings multiple ways and route the sliced sensor readings to various databases or further analysis algorithms. The data analysis layer may be used to perform in-depth analysis of segmented data. For example, the data analysis layer may leverage a variety of techniques, including but not limited to machine learning, deep learning, reinforcement learning, artificial intelligence, etc. As such, the data analysis layer may be responsible for deriving deeper insights from the raw sensor readings (e.g., deviation analysis, health index, maintenance interval, degrading components, material fatigue analysis, and vibrational fingerprinting).

These various layers described above may provide one or more metrics about an injection mold or an injection press. For example, the one or more metrics may include mold status (e.g., on, dormant, storage, maintenance, transit), cycle count, predicted maintenance interval, mold temperature profile, mold load profile, mold crash, mold component failure, mold seized, mold health, and adjustments in process parameters. The final layer may be the database layer, which may include various databases that are used to store permanent records of the raw sensor readings for later use.

II. Example Systems

The following description and accompanying drawings will elucidate features of various example embodiments. The embodiments provided are by way of example, and are not intended to be limiting. As such, the dimensions of the drawings are not necessarily to scale.

FIG. 1 is a block diagram of a computing device 100, according to example embodiments. FIG. 1 illustrates some of the components that may be included in a computing device arranged to operate in accordance with the embodiments herein. For example, the computing device 100 may represent portions of a monitoring device or a server device. Computing device 100 may be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. In some embodiments, for example, firmware 104A may include a basic input/output system (BIOS). Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs (e.g., mobile applications), such as web browsers, games, or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (WIFI), BLUETOOTH, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH, and WIFI interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a USB or high-definition multimedia interface (HDMI) port interface, for example.

In some embodiments, one or more computing devices like computing device 100 may be deployed to support the embodiments herein. The exact physical location, connectivity, and configuration of these computing devices may be unknown and/or unimportant to client devices. Accordingly, the computing devices may be referred to as "cloud-based" devices that may be housed at various remote data center locations.

Figure 2:
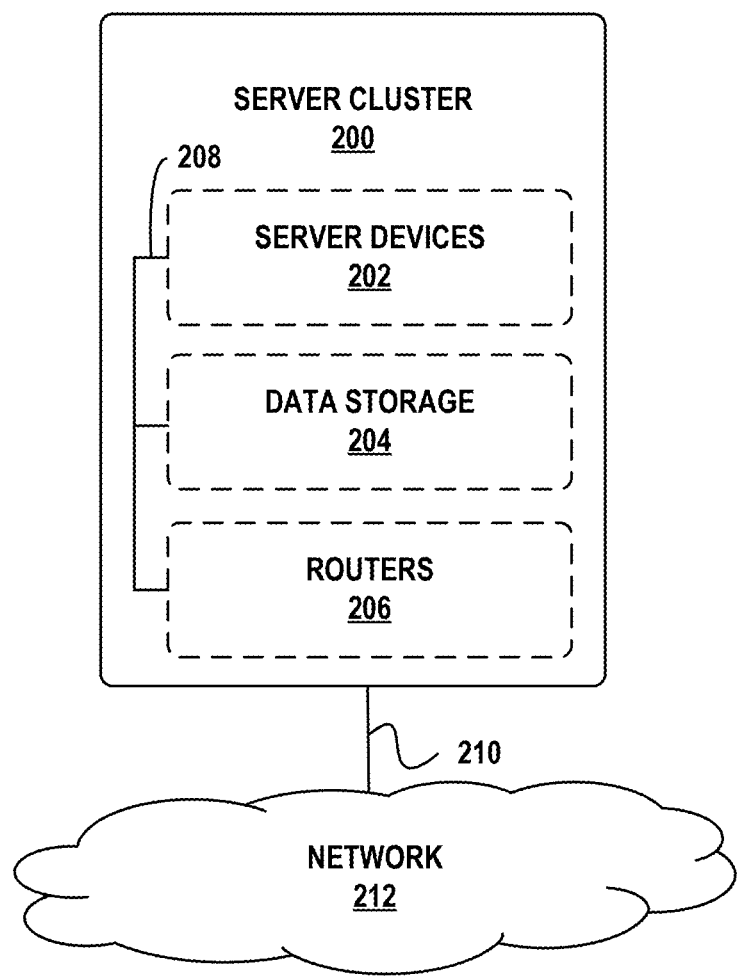
FIG. 2 is a block diagram illustration of a cloud-based server cluster, according to example embodiments.

FIG. 2 depicts a server cluster 200 (e.g., a cloud-based server cluster) in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature is understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Routers 206 may include networking equipment configured to provide internal and external communications for server cluster 200. For example, routers 206 may include one or more packet-switching and/or routing devices (including switches and/or gateways) configured to provide: (i) network communications between server devices 202 and data storage 204 via local cluster network 208 and/or (ii) network communications between server cluster 200 and other devices via communication link 210 to network 212.

Additionally, the configuration of routers 206 can be based at least in part on the data communication requirements of server devices 202 and data storage 204; the latency and throughput of the local cluster network 208; the latency, throughput, and cost of communication link 210; and/or other factors that may contribute to the cost, speed, fault-tolerance, resiliency, efficiency, and/or other design goals of the system architecture.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations (e.g., accessible via a web browser). Such a representation may take the form of a markup language, such as HyperText Markup Language (HTML), extensible Markup Language (XML), or some other standardized or proprietary format. Moreover, server devices 202 may have the capability of executing various types of computerized scripting languages, such as, but not limited to, Perl, Python, PHP Hypertext Preprocessor (PHP), Active Server Pages (ASP), JAVASCRIPT, and so on. Computer program code written in these languages may facilitate the providing of web pages to client devices, as well as client device interaction with the web pages. Alternatively or additionally, JAVA may be used to facilitate generation of web pages and/or to provide web application functionality.

Figure 3A:
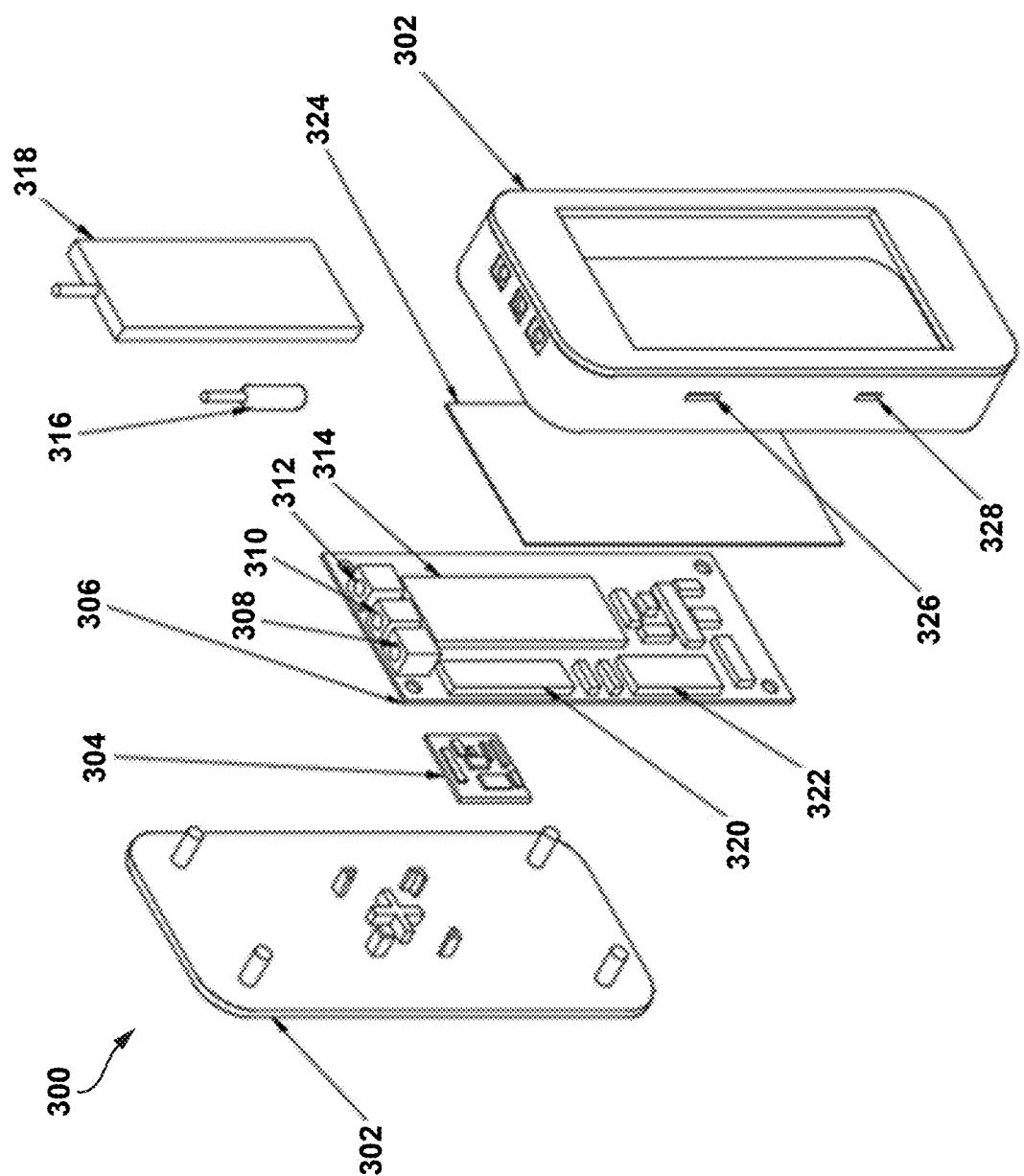
FIG. 3A is an exploded-view illustration of a monitoring device, according to example embodiments.
Figure 3B:
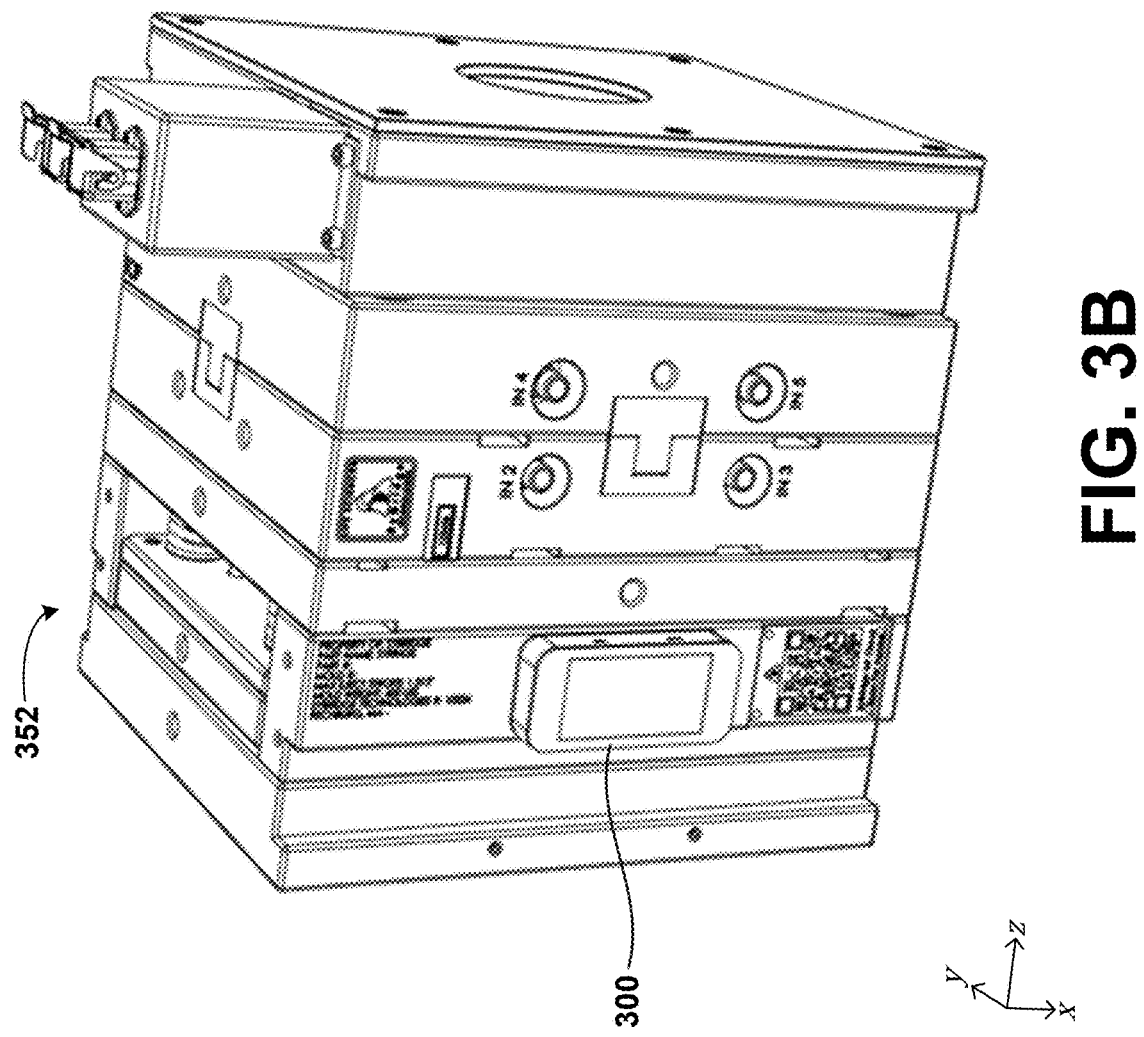
FIG. 3B is an illustration of a system, according to example embodiments.

FIG. 3A is an exploded-view illustration of a monitoring device 300, according to example embodiments. As shown in the system of FIG. 3B, the monitoring device 300 may be attachable to the exterior of a mold 352 used (e.g., by an injection press) in an injection molding process, in some embodiments. As described herein, the monitoring device 300 may include a plurality of sensors configured to collect a plurality of sensor readings associated with operation of an injection press and/or with the mold 352 usable by the injection press. Such sensor readings may be transmitted by the monitoring device 300 to an additional computing device (e.g., a server, such as the server cluster 200 shown and described with reference to FIG. 2). Thereafter, the additional computing device may determine one or more metrics associated with a state of the injection press or a state of the mold 352 based on the plurality of sensor readings (e.g., by applying one or more machine-learned models to the plurality of sensor readings). Such metrics may be provided by the additional computing device to one or more user devices (e.g., via a user interface of a browser-based app or mobile app).

The monitoring device 300 may include a housing 302 (e.g., a two-piece housing), an IMU and accelerometer sensor 304, a printed circuit board 306 (e.g., with a first sensor input 308, a second sensor input 310, a power connector 312, a controller 314, a proximity sensor 320 (i.e., distance sensor), and a temperature and humidity sensor 322 thereon), a thermocouple 316, a strain gauge 318, a display 324, a sensor viewport 326, and an environmental opening 328.

The housing 302 may encapsulate the other components of the monitoring device 300 (e.g., so as to protect the other components from environmental damage). As illustrated in FIG. 3A, the IMU and accelerometer sensor 304 may include an IMU and an accelerometer integrated onto a single printed circuit board. In alternate embodiments, though, IMU(s) and accelerometer(s) may be attached to separate printed circuit boards. The IMU and accelerometer sensor 304 may be used to identify one or more motions of: the monitoring device 300, a mold to which the monitoring device 300 is attached, and/or an injection press using a mold to which the monitoring device 300 is attached.

The printed circuit board 306 may provide multiple electrical interconnects between various other components of the monitoring device 300 (e.g., between the controller 314 and one or more sensors of the monitoring device 300). The first sensor input 308 and the second sensor input 310 may be communication ports (e.g., universal serial bus (USB) ports) to which various types of sensors may be attachable. As such, the monitoring device 300 may be modular (i.e., capable of having different sensor types swapped in and out for a given use case). The power connector 312 may be a port used for charging one or more batteries of the monitoring device 300 and/or used to connect the monitoring device 300 to a wall outlet.

The proximity sensor 320 may collect sensor readings that are usable (e.g., by the controller 314 or a server device) to determine one or more statuses associated with a mold to which the monitoring device 300 is attached (e.g., an on status, a dormant status, a maintenance status, a transit status, an in-storage status, a cycle count, a predicted maintenance interval, a mold temperature profile, a mold load profile, a mold crash, a mold component failure, a mold seized, a mold health, or an adjustment to a process parameter). As illustrated in FIG. 3A, the temperature and humidity sensor 322 may include a temperature sensor and a humidity sensor integrated into a single chip. In alternate embodiments, though, temperature sensor(s) and humidity sensor(s) may be provided as separate standalone sensors. The temperature and humidity sensor 322 may be used to measure the ambient environmental conditions in which an injection press operates or in which a mold is stored.

The thermocouple 316 may be attached to one or more portions of a mold to measure a temperature (e.g., a temperature of a resin and/or of an inside of the mold) during an injection molding process. The strain gauge 318 may be used to measure one or more forces applied to a mold or via a mold by an injection press during an injection molding process.

The display 324 may be used to provide a user interface for an injection press operator to modify operations of the monitoring device 300 during an injection molding process. For example, the display 324 may display: sensor readings collected by the sensors of the monitoring device 300 and/or one or more metrics determined (e.g., by a server) based on the collected sensor readings. The sensor viewport 326 may allow a user of the monitoring device 300 (e.g., an injection press operator) to observe internal components of the monitoring device 300 without disassembling the housing 302 of the monitoring device 300. Further, the environmental opening 328 may allow an ingress of fresh air and/or an egress of heat from an interior of the monitoring device 300.

The controller 314 may include or be communicatively coupled with on-board memory within the monitoring device 300. Further, the controller 314 may be configured to determine, based on the plurality of sensor readings, whether an ejection event has occurred. The controller 314 may also be configured to, when an ejection event has occurred, modify a sampling rate used to sample the plurality of sensors within the monitoring device 300 or a storage protocol associated with storing the plurality of sensor readings within the on-board memory; or provide, to a server device, an indication that an ejection event has occurred, wherein the indication is usable by the server device when determining one or more metrics associated with a state of the injection press or a state of the mold.

The components illustrated in the monitoring device 300 of FIGS. 3A and 3B are only provided as examples and that additional or alternative components are also possible and contemplated herein. For example, FIG. 3C is an illustration of a system, according to example embodiments. The system in FIG. 3C includes the mold 352. However, instead of a monitoring device 300 attached to an exterior of the mold 352, the system may include an array of sensor pockets 396 defined within a core plate 392 (as illustrated in FIG. 3D) and/or an array of sensor pockets 398 defined within a backplate 394 (as illustrated in FIG. 3E).

Figure 3D:
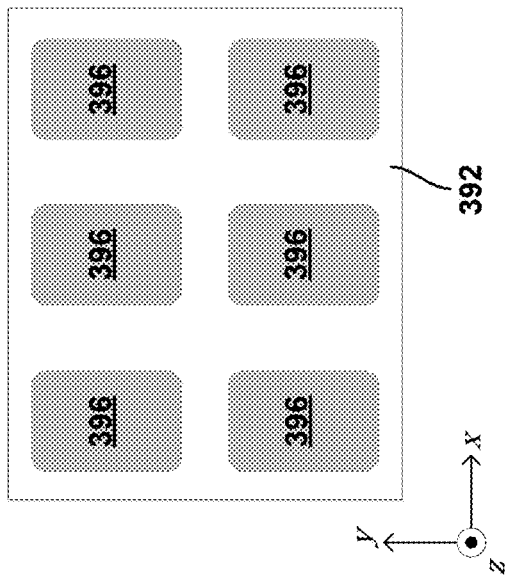
FIG. 3D is an illustration of a core plate, according to example embodiments.

As illustrated in FIG. 3D, the sensor pockets 396 defined within the core plate 392 may be approximately rectangular in shape and arranged in a two rows of three sensor pockets 396 each. Similarly, as illustrated in FIG. 3E, the sensor pockets 398 defined within the backplate 394 may be approximately circular in shape and arranged in a hexagonal arrangement. Other shapes, arrangements, and numbers of pockets are also possible and contemplated herein. In each of the sensor pockets 396, 398, an acoustic sensor or a temperature sensor may be positioned, resulting in a corresponding array of acoustic sensors and/or a corresponding array of temperature sensors. These sensors may provide sensor readings to an associated monitoring device (e.g., similar to the monitoring device 300 illustrated in FIG. 3A) via a wired or a wireless connection. Alternatively, these sensors may provide sensor readings directly to a server (e.g., via a network connection, such as a WIFI connection).

Figure 3E:
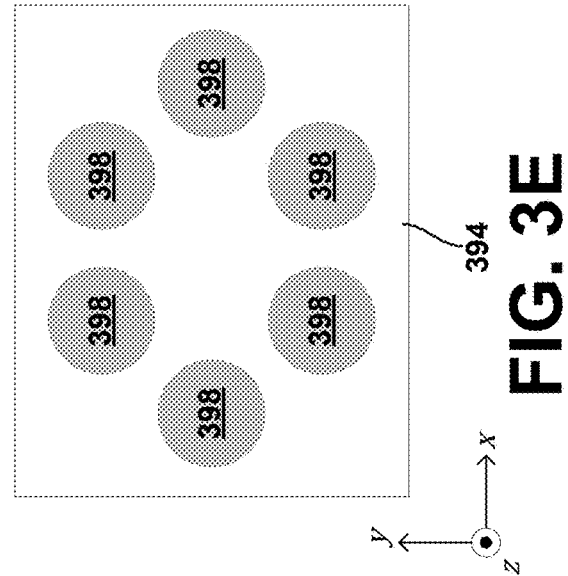
FIG. 3E is an illustration of a backplate, according to example embodiments.
Figure 3C:
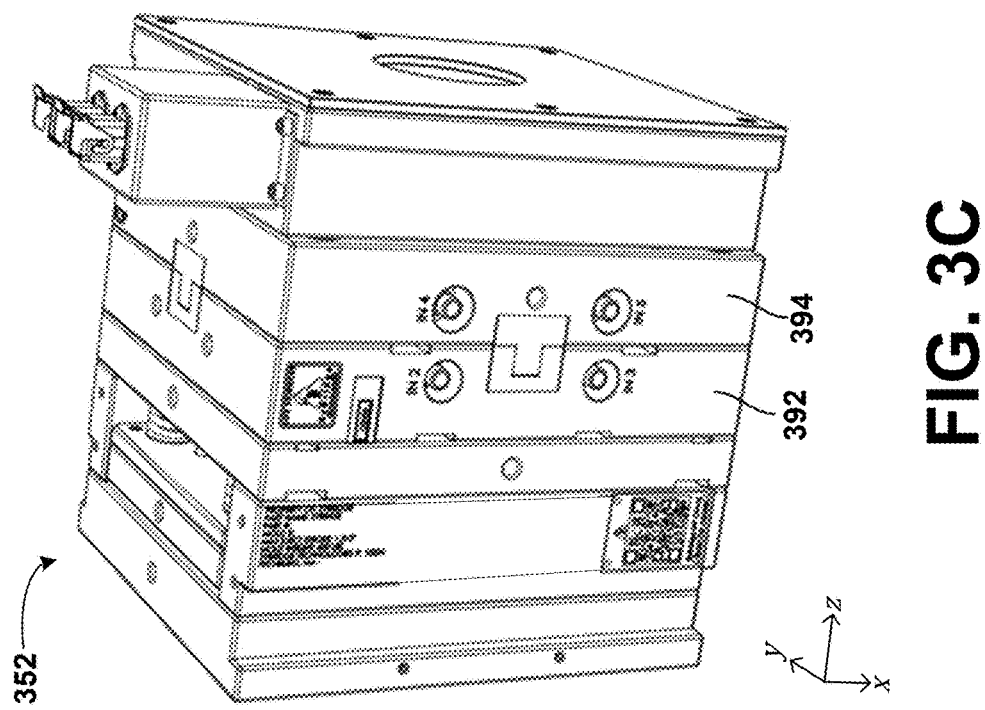
FIG. 3C is an illustration of a system, according to example embodiments.

By positioning acoustic sensor(s) and/or temperature sensor(s) in an interior of a mold (e.g., within the core plate 392 or backplate 394 as illustrated in FIGS. 3C-3E and/or within a cavity of the mold), such sensors may detect anomalies of injection molding processes performed using the mold. In some embodiments, for example, one or more sensors within a monitoring device 300 (e.g., one or more of the sensors shown and described with reference to FIG. 3A) may be used to pick out cycle characteristics for injection molding cycles, and then the internal temperature or acoustic sensors can determine whether there are any issues present occurring within the mold for a given cycle. If there are issues occurring within the mold for the given cycle, based on the arrangements of the acoustic and/or temperature sensors across different plates, the sensor readings from the acoustic and/or temperature sensors may be used to determine which plates (e.g., the core plate 392 vs. the backplate 394) and, specifically, which portions of which plates, are experiencing cycle anomalies. Additionally or alternatively, acoustic sensor(s) and/or temperature sensor(s) may be positioned near a sprue or on the back or front of a mold stack. As such the acoustic sensor(s) and/or temperature sensor(s) may also be used to identify anomalies in other locations (e.g., besides the core plate 392 and/or the backplate 394). The sensor pockets 396, 398 and associated acoustic and/or temperature sensors described could be used in conjunction with (e.g., connected to) or instead of the monitoring device 300 shown and described with reference to FIGS. 3A and 3B.

Figure 4A:
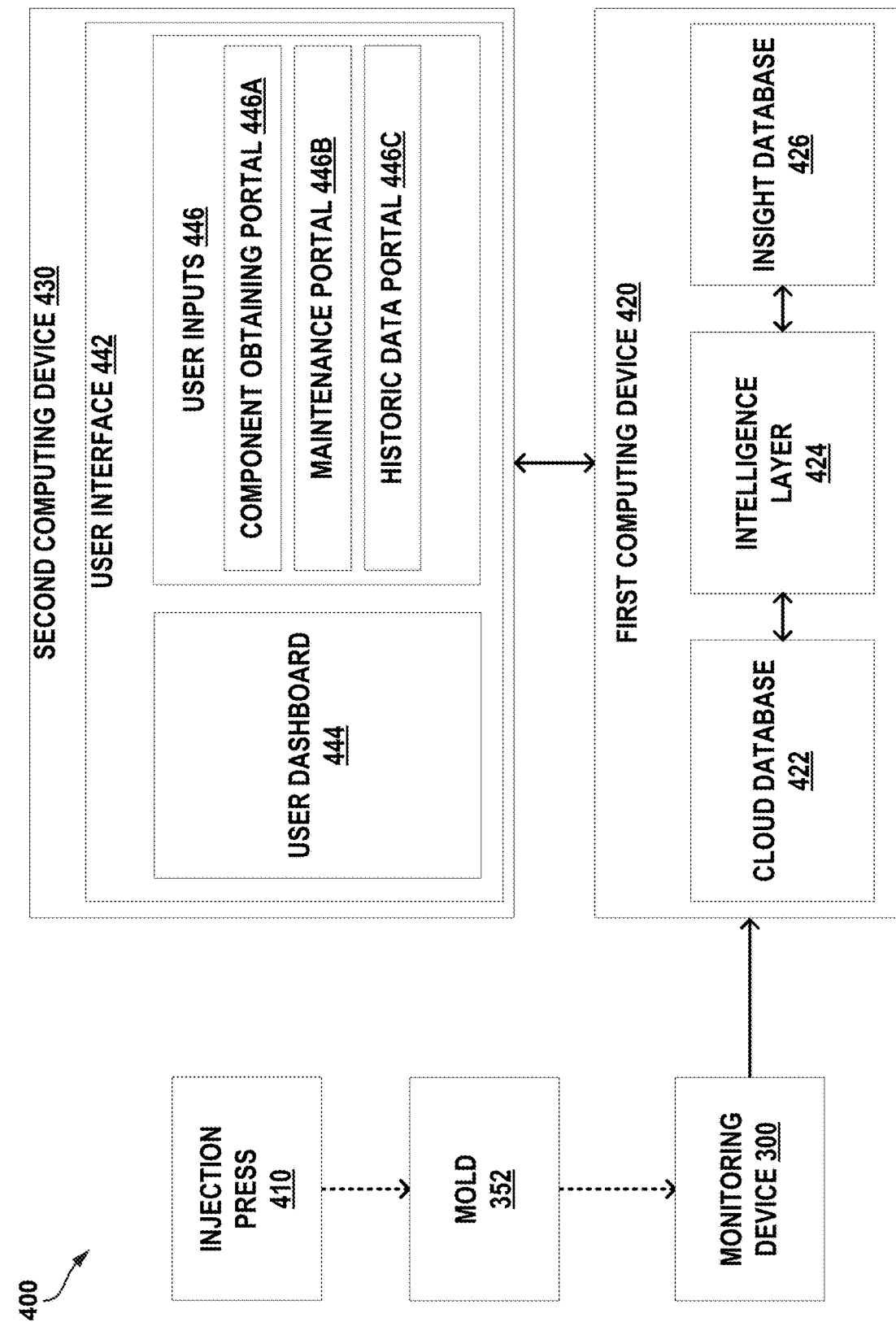
FIG. 4A is a block diagram illustration of a system, according to example embodiments.

FIG. 4A is a block diagram illustration of a system 400, according to example embodiments. In particular, FIG. 4A illustrates physical interactions (dashed arrows) and data communications (solid arrows) between various components of the system 400. As illustrated, the system 400 may include an injection press 410, a mold (e.g., the mold 352 shown and described with reference to FIG. 3B), a monitoring device (e.g., the monitoring device 300 shown and described with reference to FIGS. 3A and 3B), a first computing device 420 (e.g., a server device, such as the server cluster 200 shown and described with reference to FIG. 2), and a second computing device 430 (e.g., an injection molding technician's computer or mobile device).

As shown in FIG. 4A, the injection press 410 may act on the mold 352. For example the mold 352 may be inserted into or otherwise attached to the injection press 410 and the injection press 410 may use the mold 352 to fabricate an injection molded part (e.g., using heated plastic resin). The monitoring device 300 may be physically attached to the mold 352 (e.g., removably attached or otherwise adhered to an exterior of the mold 352). Hence, any vibrations, temperature changes, or other physical changes experienced by the mold 352 may be monitored by the monitoring device 300 (e.g., one or more sensors of a plurality of sensors of the monitoring device 300 may collect a plurality of sensor readings). The sensor readings collected by the monitoring device 300 may then be transmitted (e.g., over the public internet or a private network) to the first computing device 420. For example, a network interface of the monitoring device 300 may transmit the sensor readings to the first computing device 420.

As illustrated in FIG. 4A, the first computing device 420 may include a cloud database 422, an intelligence layer 424, and an insight database 426 all in communication with one another. The first computing device 420 may store the sensor readings received from the monitoring device 300 within the cloud database 422 for further analysis. Thereafter, the intelligence layer 424 may analyze the sensor readings to determine one or more metrics associated with a state of the injection press 410 or a state of the mold 352. Analyzing the sensor readings may include applying a machine-learned model to the plurality of sensor readings, for example. Additionally, the one or more metrics may be indicative of material fatigue of one or more components of the mold 352, an aberration in a behavior of the injection press 410 or the mold 352, a prescribed interval between maintenance events for the mold 352, a state of degradation of one or more components of the mold 352, or a vibrational fingerprint of the mold 352 during the operation of the injection press 410.

Upon the intelligence layer 424 determining the one or more metrics, the insight database 426 may be used to determine how to display the one or more metrics via the user interface 442 and/or which additional actions to take next (e.g., whether to obtain replacement parts, replace the mold 352, modify injection press operating parameters, etc.). For example, in some embodiments, the first computing device 420 may determine, based on the one or more metrics, one or more adjustments to the operation of the injection press 410 or one or more modifications to the mold 352. These adjustments or modifications may be provided to the monitoring device 300 (which may be configured to control the injection press 410, in some embodiments). The one or more adjustments may be usable by the monitoring device 300 to initiate an adjustment to the operation of the injection press 410. Likewise, the one or more modification to the mold may be usable by the monitoring device 300 to initiate a modification to the mold 352.

Thereafter, the first computing device 420 may provide the one or more metrics and any associated information to the second computing device 430 via the user interface 442. For example, the first computing device 420 may provide information for a user dashboard 444 that includes multiple determined metrics (e.g., the time-evolution of multiple metrics for a given mold 352). Further, the first computing device 420 may provide a prompt for one or more user inputs 446. For example the first computing device 420 may provide a prompt for obtaining one or more replacement parts for the mold 352 and/or for initiating maintenance on the mold 352. Alternatively, such user inputs 446 may be unprompted (e.g., users may determine, themselves, that the one or more metrics displayed on the user dashboard 444 necessitate an action and may input that action accordingly).

In some embodiments, the one or more metrics determined by the first computing device 420 may be stored, by the first computing device 420, in one or more databases (e.g., within the cloud database 422). Prior to providing information about the one or more metrics to the second computing device 430 via the user interface 442, the first computing device 420 may receive, from the second computing device 430, a request to access the one or more metrics. The request may include one or more authentication credentials. Thereafter, the first computing device 420 may compare the one or more authentication credentials received to a list of authentication credentials for which access to information associated with the injection press 410 or the mold 352 is permitted. Thereafter, only when the authentication credentials provided are listed on the list of authentication credentials for which access to information associated with the injection press 410 or the mold 352 is permitted, the first computing device 420 may provide the one or more metrics to the second computing device 430.

As also illustrated in FIG. 4A, the second computing device 430 may include a user interface 442 (e.g., a user interface that is displayed on a display of the second computing device 430 based on information provided to the second computing device 430 from the first computing device 420). The user interface 442 may include a user dashboard 444 and a series of user inputs 446. The user inputs may include a component obtaining portal 446A through which a user can initiate obtaining additional or replacement components associated with one or more molds or one or more injection presses, a maintenance portal 446B through which a user can generate a maintenance request to perform maintenance on one or more molds or one or more injection presses, and a historic data portal 446C through which a user can retrieve previous information related to one or more molds or one or more injection presses.

FIG. 4B illustrates a method of training a machine-learned model 470 (e.g., an ANN, such as a GAN, or a support vector machine), according to example embodiments. The method of FIG. 4B may be performed by a computing device (e.g., the computing device 100 illustrated in FIG. 1 or a different computing device), in some embodiments. As illustrated, the machine-learned model 470 may be trained using a machine-learning training algorithm 460 based on training data 450 (e.g., based on patterns within the training data 450). While only one machine-learned model 470 is illustrated in FIGS. 4B and 4C, multiple machine-learned models could be trained simultaneously and/or sequentially and used to perform the predictions described herein. For example, in the case of a GAN, one or more generators and one or more discriminators could be simultaneously trained. Ultimately, a prediction 490 may be made using the trained machine-learned model 470 (e.g., by one or more generators of a GAN or by the support vector machine). For example, the machine-learned model 470 may be used (e.g., by the computing device 100) to determine one or more metrics associated with a state of the injection press or a state of the mold.

The machine-learned model 470 may include, but is not limited to: one or more ANNs (e.g., one or more convolutional neural networks, one or more recurrent neural networks, one or more Bayesian networks, one or more hidden Markov models, one or more Markov decision processes, one or more logistic regression functions, one or more suitable statistical machine-learning algorithms, one or more heuristic machine-learning systems, one or more GANs, etc.), one or more support vector machines, one or more regression trees, one or more ensembles of regression trees (i.e., regression forests), one or more decision trees, one or more ensembles of decision trees (i.e., decision forests), and/or some other machine-learning model architecture or combination of architectures.

Notably, the machine-learned model 470 may incorporate one or more of a wide array of models. Supervised learning models, such as linear regression, logistic regression, support vector machines, and decision trees, are trained on labeled data, meaning the model learns from input-output pairs. Unsupervised learning models, including k-means clustering, hierarchical clustering, and principal component analysis (PCA), work with unlabeled data to find hidden patterns or intrinsic structures. Semi-supervised learning models combine an amount of labeled data with a larger amount of unlabeled data during training. Reinforcement learning models, such as Q-learning and deep Q-networks (DQNs), involve agents learning to make decisions by receiving rewards or penalties for their actions in a given environment. Additionally, there are specialized models like neural networks and deep learning models, which include convolutional neural networks (CNNs) for processing of hierarchical data and recurrent neural networks (RNNs) for sequence data. In some cases, generating artificial intelligence (genAI) models may be used as well. Any two or more of these models can be combined to form various ensemble models.

The machine-learning training algorithm 460 may involve supervised learning, semi-supervised learning, reinforcement learning, and/or unsupervised learning. Similarly, the training data 450 may include labeled training data and/or unlabeled training data. Further, similar to described above with respect to the machine-learned model 470, a number of different machine-learning training algorithms 460 could be employed herein. If the machine-learned model 470 includes a GAN, the machine-learning training algorithm 460 may include training one or more discriminator ANNs and one or more generator ANNs based on the training data 450.

Additionally, the machine-learning training algorithm 460 may be tailored and/or altered based on the machine-learned model 470 to be generated (e.g., based on desired characteristics of the output machine-learned model 470). Further, the training data 450 may be used to train the machine-learned model 470 using the machine-learning training algorithm 460. For example, the machine-learned model 470 may include labeled training data that is used to train the machine-learned model 470. For instance, training the discriminator(s)/generator(s) may occur in a supervised fashion using labeled training data and/or using sample input training data for the generator(s). Further, in some embodiments, the machine-learning training algorithm 460 may enforce rules during the training of the machine-learned model 470 through the use of one or more hyperparameters.

Once the machine-learned model 470 is trained by the machine-learning training algorithm 460 (e.g., using the method of FIG. 4B), the machine-learned model 470 may be used to make one or more predictions (i.e., inferences). For example, a computing device (e.g., the computing device 100 shown and described with reference to FIG. 1), may make a prediction 490 using the machine-learned model 470 based on input data 480, as illustrated in FIG. 4C.

In some embodiments, each type (e.g., make and model) of mold or each individual mold may be associated with a different machine-learned model 470. Further, in some cases, the process of training the respective machine-learned models 470 (e.g., according to the technique shown and described with FIG. 4B) may be performed in lock-step with the process of designing the respective molds. For example, a mold builder may begin designing a mold using computer-aided design (CAD) software. During the design process, the mold builder may assemble the components into a functioning mold. After the mold is designed, the mold components may be procured and the mold may be assembled using the procured components.

After the mold is assembled, the mold builder may perform a "tryout." A tryout is a trial injection molding process using the assembled mold. For example, the mold builder may install the assembled mold into a fully functioning injection press operation and run the injection molding process with an identical or similar plastic resin as intended to be used during part production. The tryout may be used to validate that the mold design and assembly is functional and producing parts of sufficient quality. In addition, the tryout may be used to determine the proper injection molding process parameters (e.g., parameters of the injection press) that produce quality parts at desired cycle times. In some cases, the mold builder may iterate through various hold pressure settings to determine what settings produce the desired part. Similarly, the mold builder may iterate through various process parameters until they arrive at a process that passes the quality and operating parameters. After the tryout, the mold builder may record the process parameters, which are later provided to those who will use the mold in full production. Injection molding process parameters used during the tryout may include mold open distance segments (e.g., measured in inches or cm), mold open velocity segments (e.g., measured in %), mold close distance segments (e.g., measured in inches or cm), mold close velocity segments (e.g., measured in %), ejector back position (e.g., measured in inches or cm), ejector back velocity (e.g., measured in %), ejector forward position (e.g., measured in inches or cm), ejector forward velocity (e.g., measured in %), number of ejection strokes, mold temperature (e.g., measured in degrees Celsius or degrees Fahrenheit), injection shot size (e.g., measured in inches or cm), injection decompression (e.g., measured in inches or cm), injection screw start position (e.g., measured in inches or cm), injection transfer position (e.g., measured in inches or cm), injection velocity (e.g., measured in inches/see or cm/sec), inject time (e.g., measured in see), transfer pressure (e.g., measured in Pa or psi), pack pressure (e.g., measured in Pa or psi), pack time (e.g., measured in see), hold pressure (e.g., measured in Pa or psi), hold time (e.g., measured in see), pack velocity (e.g., measured in inches/see or cm/sec), peak pressure (e.g., measured in Pa or psi), cushion complete (e.g., measured in inches or cm), recovery back pressure (e.g., measured in Pa or psi), screw rotation (e.g., measured in rpms), plastication (e.g., measured in see), cool time (e.g., measured in see), and/or cycle time (e.g., measured in see).

As described above, each mold may have one or more unique machine-learned models 470. These unique machine-learned models 470 may be trained using sensor readings from the tryout (e.g., sensor readings collected by a monitoring device 300 attached to the mold during the tryout), the injection molding process parameters, and parameters of the design of the mold and/or the design of the part to be injection molded. The labeled sensor data from the tryout may be representative of the sensor readings one would expect during proper operation. As such, this data may be treated by the machine-learning training algorithm 460 as the baseline for future anomaly and deviation detection. Example types of anomalies include mold close anomalies, injection anomalies, cooling anomalies, mold open anomalies, and ejection anomalies.

The injection molding process parameters may be fed as training data 450 into the machine-learning training algorithm 460 to establish the process cadence. These injection molding process parameters may be used to train the machine-learned model 470 how long each event should ideally take during an injection molding process using the mold. The architecture of the machine-learned model 470 described herein may be designed to segment and decompose the raw sensor readings into as many significant segments as possible. For example, the machine-learned model 470 may analyze when a cycle starts and ends based on sensor readings from a proximity sensor. After a start and end have been identified, the machine-learned model 470 may then use a classification score profile (ClaSP) feature detection algorithm to further decompose the sensor readings into significant cycle events. Significant cycle events may include cycle time, molding time, close time, close impulse, close travel, open full speed, open slow down, ejection, lag time, ejection delay, injection screw forward, injection screw travel, injection screw stop, packing time, injection screw backoff, random event count, and random event indices.

Once the sensor readings have been fully decomposed into significant cycle events, the machine-learned model 470 may include a segment that feeds the sensor readings into a temporal outlier factor model anomaly detection method. The temporal outlier factor model portion of the machine-learned model 470 may compare the current set of sensor readings to the trained dataset. As such, the temporal outlier factor model may score how significantly the current set of sensor readings (e.g., for a given cycle event) deviates from the trained dataset. The deviation score and raw sensor readings of the anomaly event may ultimately be output from the temporal outlier factor model. This deviation score and the raw sensor readings may then be fed into a support vector machine model of the machine-learned model 470. The support vector machine may be trained on the sensor readings from the tryout. Each set of sensor readings (e.g., for a given cycle event) may be fed into the support vector machine model to determine if that set of sensor readings is within the acceptable bounds for injection molding process performance.

While the same computing device (e.g., a computing device 100 as in FIG. 1) may be used to both train the machine-learned model 470 (e.g., as illustrated in FIG. 4C) and make use of the machine-learned model 470 to make a prediction 490 (e.g., as illustrated in FIG. 4C), this need not be the case. In some embodiments, for example, a computing device may execute the machine-learning training algorithm 460 to train the machine-learned model 470 and may then transmit the machine-learned model 470 to another computing device (e.g., the first computing device 420 shown and described with reference to FIG. 4A) for use in making one or more predictions 490. In the context of this disclosure, for example, a computing device may be used to initially train the machine-learned model 470 and then this machine-learned model 470 could be stored for later use.

Figure 5A:
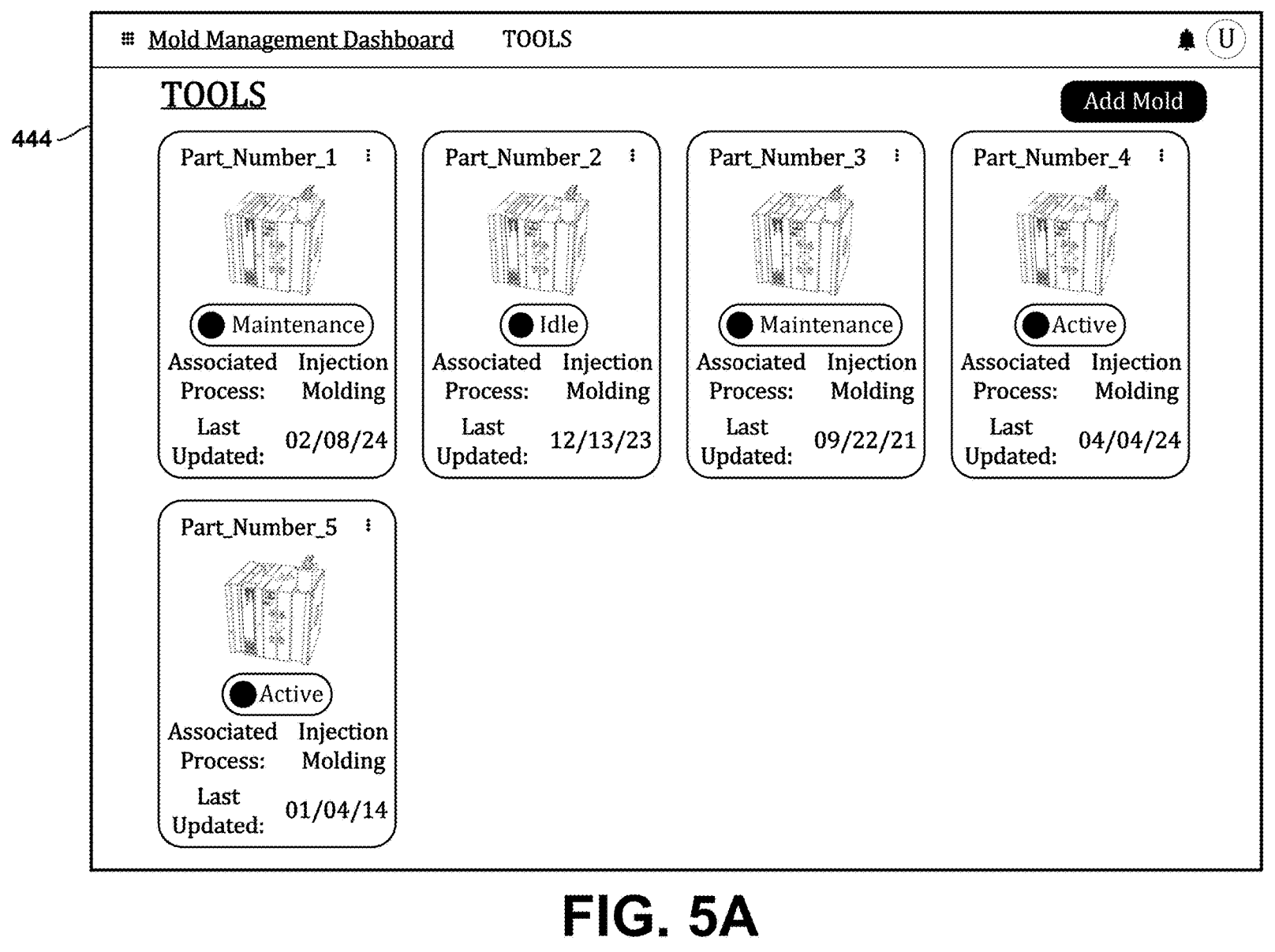

FIG. 5A is an illustration of a user dashboard 444 associated with an application (e.g., a browser-based app or a mobile app), according to example embodiments. The user dashboard 444 may be displayed on the second computing device 430 as part of a user interface 442 (e.g., as shown and described with reference to FIG. 4A).

As illustrated, the user dashboard 444 may have a wide variety of molds (i.e., tools) displayed. Upon receiving a selection of one of the molds, the user dashboard 444 may display additional information on the mold (e.g., similar to the information shown and described with reference to FIG. 5B). For each of the selectable molds, the user dashboard 444 may display a part number or other identifier (e.g., a stock keeping unit (SKU)), a three-dimensional image of the mold (or of a CAD model of the mold), a mold status (e.g., idle, maintenance, active, etc.), a type of associated process (e.g., injection molding, blow molding, rotational molding, compression molding, etc.), and a date on which the information about that mold was last updated. Further, the user dashboard 444 may allow a user to log out or log in (e.g., by selecting their user icon in the upper-right-hand corner), allow a user to see any notifications (e.g., by selecting the bell icon in the upper-right-hand corner), or add information on additional molds they are associated with (e.g., by selecting the "Add Mold" icon in the upper-right-hand corner).

Figure 5B:
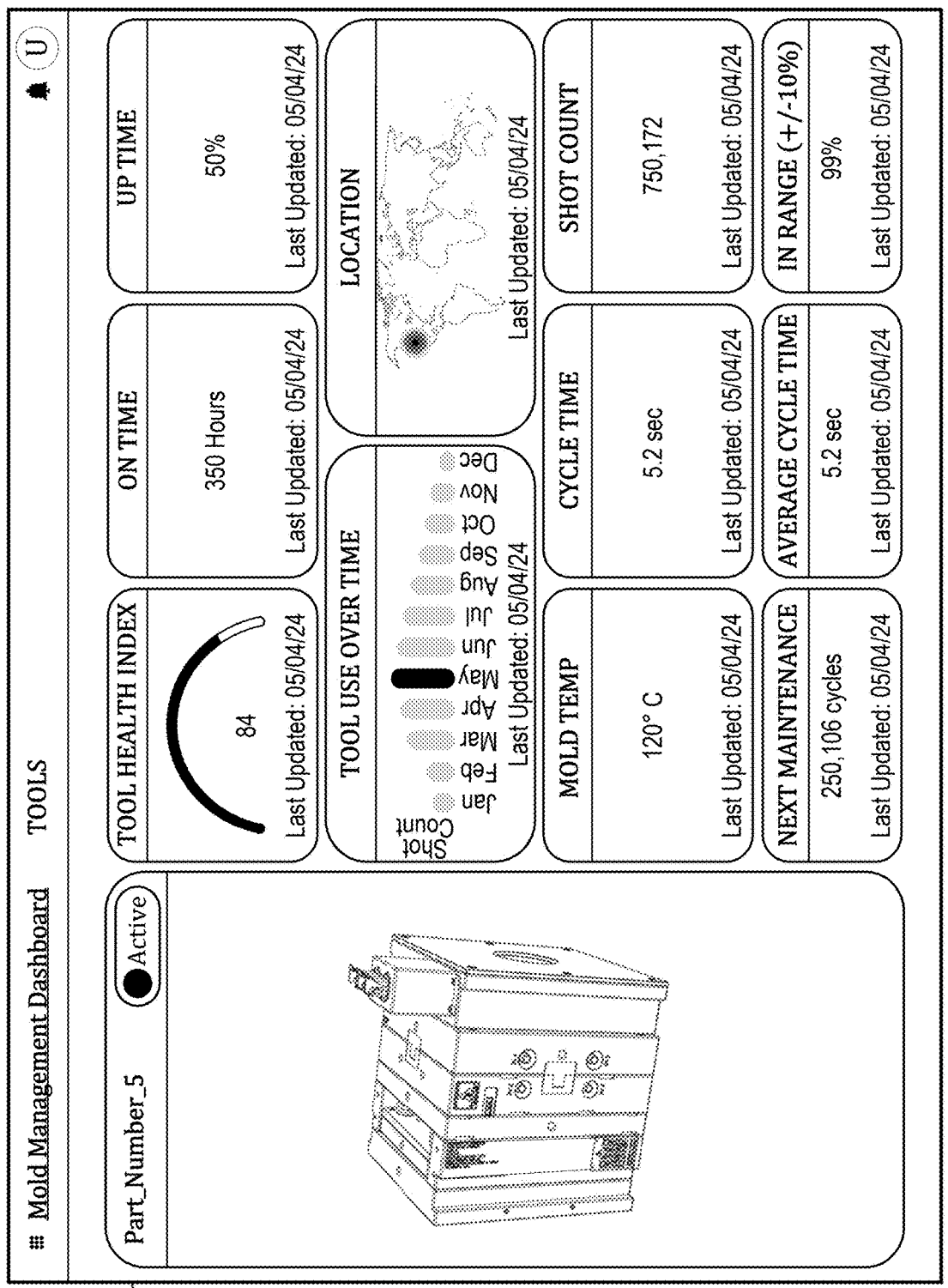
FIG. 5B is an illustration of a user dashboard associated with an application (e.g., a browser-based app or a mobile app), according to example embodiments.

FIG. 5B is an illustration of a user dashboard 444 associated with an application (e.g., a browser-based app or a mobile app), according to example embodiments. The user dashboard 444 may be displayed on the second computing device 430 as part of a user interface 442 (e.g., as shown and described with reference to FIG. 4A). Further, the illustration of FIG. 5B may be displayed after selecting "Part Number_5" from the selection screen illustrated in FIG. 5A. As illustrated in FIG. 5B, the user dashboard 444 may provide a part number or other identifier (e.g., a SKU), a three-dimensional image of the mold (or of a CAD model of the mold), a mold status (e.g., idle, maintenance, active, etc.), and one or more metrics (e.g., one or more metrics about the mold or an associated injection press determined by the first computing device 420 based on sensor readings from the monitoring device 300). As shown, the one or more metrics may include a tool health index (e.g., along with a date of last update), an on time metric (e.g., along with a date of last update), an up time (e.g., along with a date of last update), tool use over time as a histogram (e.g., along with a date of last update), tool location on a map (e.g., along with a date of last update), a mold temperature (e.g., along with a date of last update), a cycle time (e.g., along with a date of last update), a shot count (e.g., along with a date of last update), a number of cycles until next maintenance (e.g., along with a date of last update), an average cycle time (e.g., along with a date of last update), and an in range (e.g., along with a date of last update).

Additionally or alternatively, in some embodiments, the one or more metrics provided may be indicative of: material fatigue of one or more components of the mold, an aberration in a behavior of the injection press or the mold, a prescribed interval between maintenance events for the mold, a state of degradation of one or more components of the mold, or a vibrational fingerprint of the mold during the operation of the injection press. Likewise, in addition to providing a tool health index (i.e., an index which representative of a current condition of the mold), the user dashboard 444 may additionally or alternatively provide a plurality of historical values of the tool health index.

The content provided in the user dashboard 444 shown and described with reference to FIGS. 5A and 5B is provided solely as an example and that additional or alternative content (e.g., additional or alternative metrics about the mold 352 or the injection press 410) may also be displayed via the user dashboard 444 and/or the user interface 442 of the second computing device 430. For example, in some embodiments, the monitoring device 300 may capture sensor readings at multiple points in time. Then, based on these various sensor readings, the first computing device 420 may determine an estimation of a next required maintenance (e.g., of the mold 352 or of the injection press 410) by applying the machine-learned model 470 to the various sensor readings. The estimation of the next required maintenance may also be displayed on the user dashboard 444 and/or the user interface 442.

In still other embodiments, the one or more metrics provided by the first computing device 420 (e.g., and displayed on the user interface 442 and/or user dashboard 444 of the second computing device 430) may include providing a maintenance alert to the second computing device 430, scheduling a maintenance time, dispatching a service technician to perform maintenance on the injection press 410 or the mold 352, providing a SKU number for a replacement part or a replacement mold to the second computing device 430, obtaining the replacement part or the replacement mold, re-routing a planned delivery (e.g., a planned delivery of a mold, an injection press, a replacement part for the mold or the injection press, or a molded part), scheduling production using a different injection press than the injection press 410 or using a different mold than the mold 352, scheduling production at a different fabrication facility than a fabrication facility at which the injection press 410 or the mold 352 is located, or providing a prompt (e.g., a prompt for a user input 446 via the user interface 442) to obtain the replacement part or the replacement mold. Yet further, the one or more metrics provided by the first computing device 420 may also include an expected count of parts made using the injection press 410 or the mold 352 or an expected delivery date for parts made using the injection press 410 or the mold 352. Even further, the one or more metrics provided by the first computing device 420 may include a suggested intervention for the injection press 410 or the mold 352.

Figure 6:
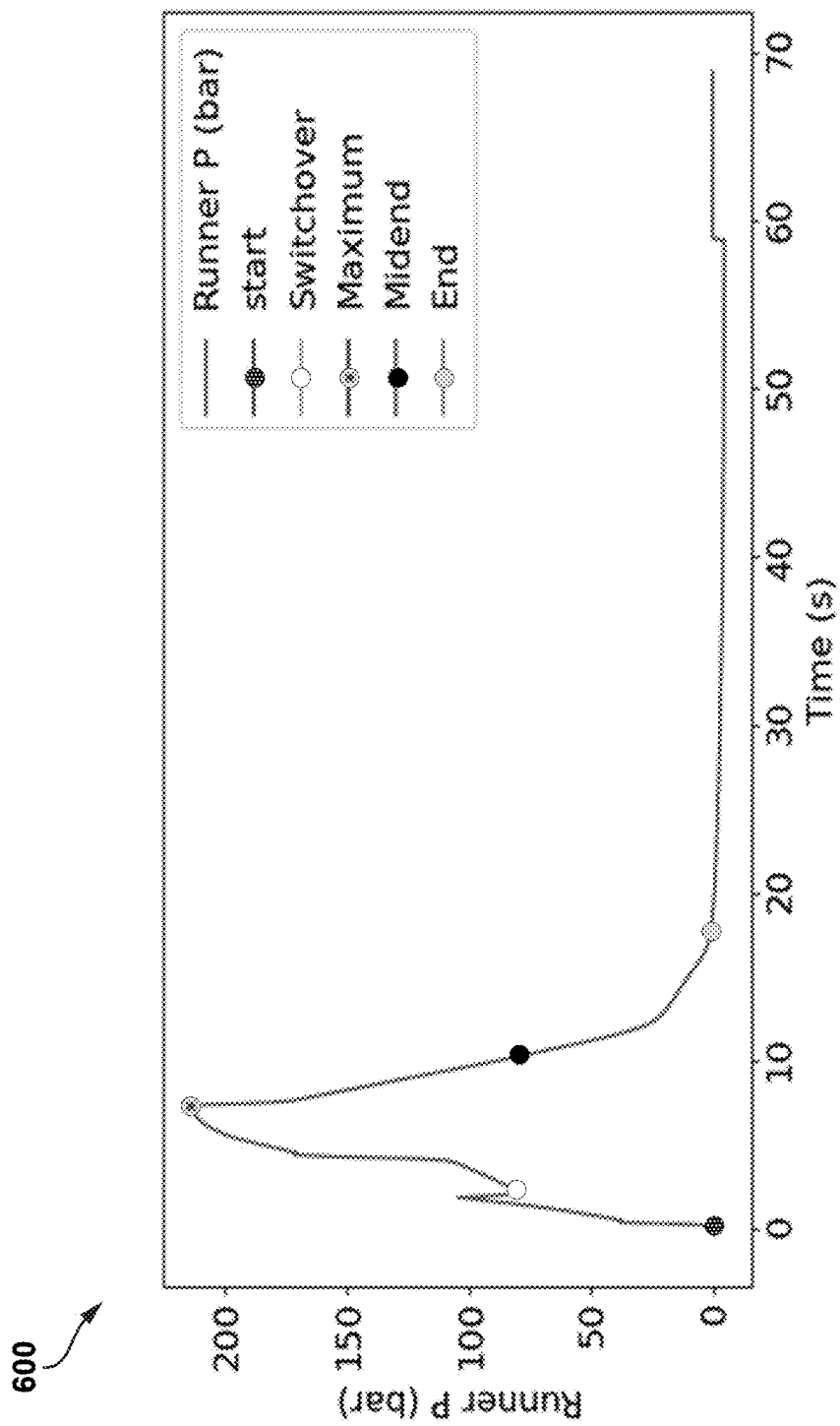
FIG. 6 is an illustration of a technique by which a computing device may determine one or more metrics associated with a state of an injection press or a state of a mold, according to example embodiments.

FIG. 6 is an illustration of a technique by which a computing device (e.g., the first computing device 420 shown and described with reference to FIG. 4A) may determine one or more metrics associated with a state of an injection press (e.g., the injection press 410 shown and described with reference to FIG. 4A) or a state of a mold (e.g., the mold 352 shown and described with reference to FIGS. 3A, 3B, and 4A), according to example embodiments. The technique may be used by the first computing device 420 (e.g., an intelligence layer 424 of the first computing device 420) to determine which portion of a cycle or shot the injection press 410 or mold 352 is currently in.

For example, the technique may include generating a graphical representation 600 of pressure over time. In some embodiments, sensor readings of pressure may be obtained by the monitoring device 300 using a strain gauge 318. These sensor readings may then be transmitted by the monitoring device 300 (e.g., by a controller 314 of the monitoring device 300) to the first computing device 420 along with timestamps. The first computing device 420 may use these sensor readings to generate the graphical representation 600. Based on the shape of the curve of pressure over time, the first computing device 420 may determine when different stages of an injection molding process take place. For example, as illustrated, a start stage, a switchover stage, a maximum stage, a midend stage, and an end stage are each identified. The stage of an injection molding process may be used by the first computing device 420 to inform other determinations (e.g., as part of determining one or more metrics to transmit to the second computing device 430). The graphical representation 600 of FIG. 6 is provided solely as an example and that other representations make additionally or alternatively be determined based on sensor readings from one or more sensors of the monitoring device 300.

Figure 7A:
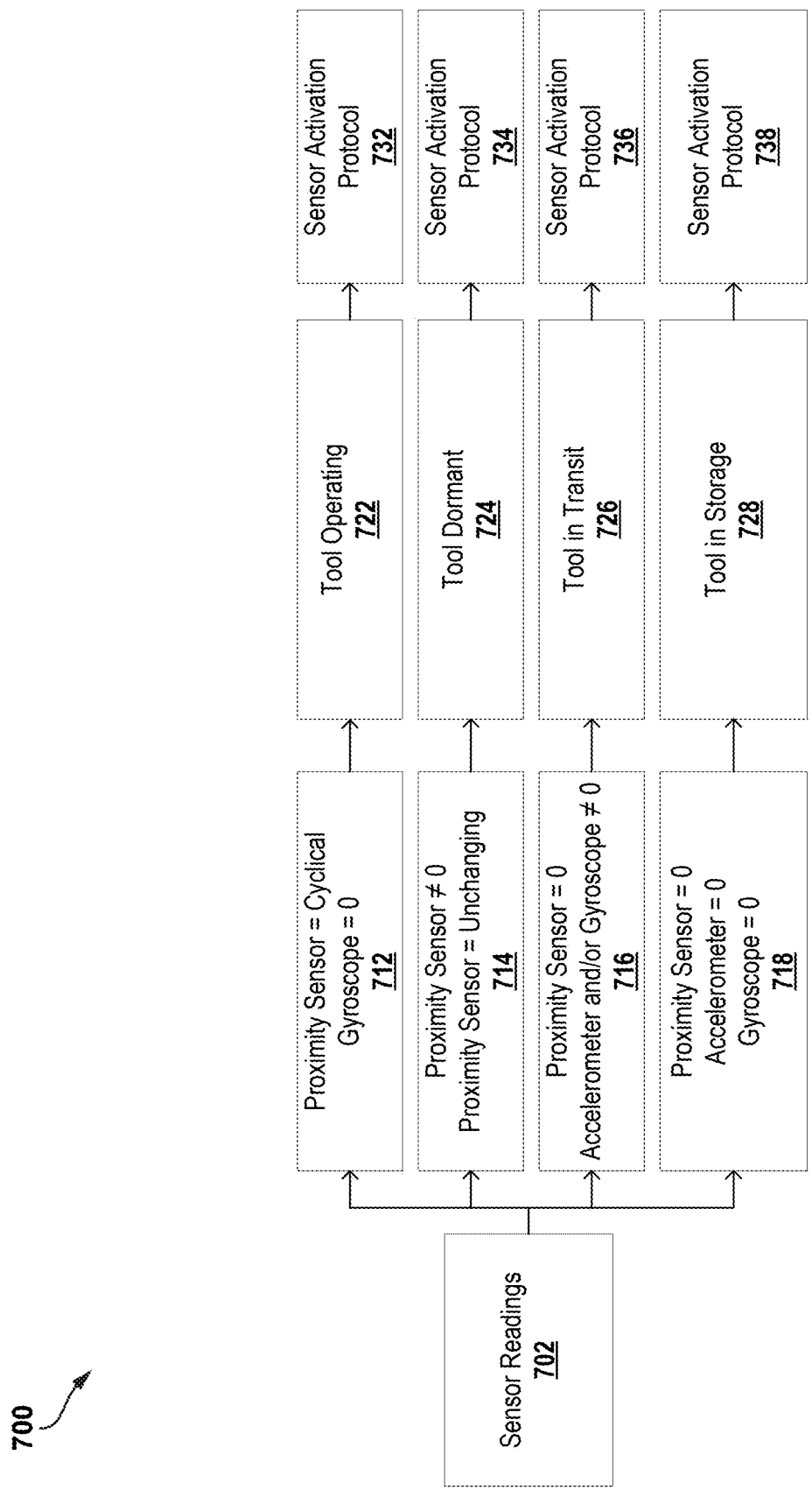
FIG. 7A is an illustration of a sensor classification protocol, according to example embodiments.

FIG. 7A is an illustration of a sensor classification protocol 700, according to example embodiments. The sensor classification protocol 700 may be performed by the monitoring device 300 in order to determine the present status of the mold 352 and/or the injection press 410. By determining the present status of the mold 352 and/or the injection press 410, the monitoring device 300 may be able to determine which sensors should be activated, how often and/or what type of sensor readings should be collected (e.g., a sampling rate used to sample the plurality of sensors and/or a storage protocol associated with storing the plurality of sensor readings within an on-board memory), and/or which sensor readings to transmit to the first computing device 420 (e.g., the monitoring device 300 may provide, for example, an indication that an ejection event has occurred to the first computing device 420, wherein the indication is usable by the first computing device 420 in determining the one or more metrics associated with the state of the injection press 410 or the state of the mold 352).

As illustrated, upon collecting initial sensor readings 702, the monitoring device 300 may determine which of a plurality of statuses are present. If the proximity sensor has provided cyclical sensor readings and a gyroscope (e.g., an IMU) has provided a sensor reading of 0, status 712 may be present, which means that the tool is operating 722. When the tool is operating 722, the monitoring device 300 may perform sensor activation protocol 732 (e.g., as shown and described with reference to FIG. 7B).

If the proximity sensor has sensor readings not equal to 0 and sensor readings that are not changing, status 714 may be present, which means that the tool is dormant 724. When the tool is dormant 724, the monitoring device 300 may perform sensor activation protocol 734 (e.g., as shown and described with reference to FIG. 7C).

If the proximity sensor has sensor readings equal to 0 and either the accelerometer and/or gyroscope (e.g., an IMU) have sensor readings that are not equal to 0, status 716 may be present, which means that the tool is in transit 726. When the tool is in transit 726, the monitoring device 300 may perform sensor activation protocol 736 (e.g., as shown and described with reference to FIG. 7D).

If the proximity sensor has sensor readings equal to 0, the accelerometer has sensor readings equal to 0, and the gyroscope has sensor readings equal to 0, status 718 may be present, which means that the tool is in storage 728. When the tool is in storage 728, the monitoring device 300 may perform sensor activation protocol 738 (e.g., as shown and described with reference to FIG. 7E).

FIG. 7B is an illustration of a sensor activation protocol 732, according to example embodiments. The sensor activation protocol 732 may be performed by the monitoring device 300 when the monitoring device 300 determines that a tool is operating 722. As illustrated, the sensor activation protocol 732 may include the monitoring device 300 receiving sensor readings from a gyroscope (e.g., an IMU) 742. If the gyroscope sensor readings indicate that the rotation in any axis is above a predetermined angle 752 (e.g., above one degree, above two degrees, above three degrees, above four degrees, above five degrees, etc.), the monitoring device 300 may return to performing the sensor classification protocol 700 shown and described with reference to FIG. 7A. The sensor activation protocol 732 may also include the monitoring device 300 receiving sensor readings from an accelerometer 744. If the accelerometer sensor readings indicate movement above a predetermined length in a y-axis or in a z-axis 754 (e.g., over 5 cm, over 10 cm, over 15 cm, over 20 cm, over 25 cm, etc.), the monitoring device 300 may return to performing the sensor classification protocol 700 shown and described with reference to FIG. 7A. Further, the sensor activation protocol 732 may also include the monitoring device 300 receiving sensor readings from a proximity sensor 746. If the proximity sensor's sensor readings remain static for a predetermined time period 756 (e.g., over 5 seconds, over 10 seconds, over 15 seconds, over 20 seconds, over 25 seconds, over 30 seconds, etc.), the monitoring device 300 may return to performing the sensor classification protocol 700 shown and described with reference to FIG. 7A.

Figure 7C:
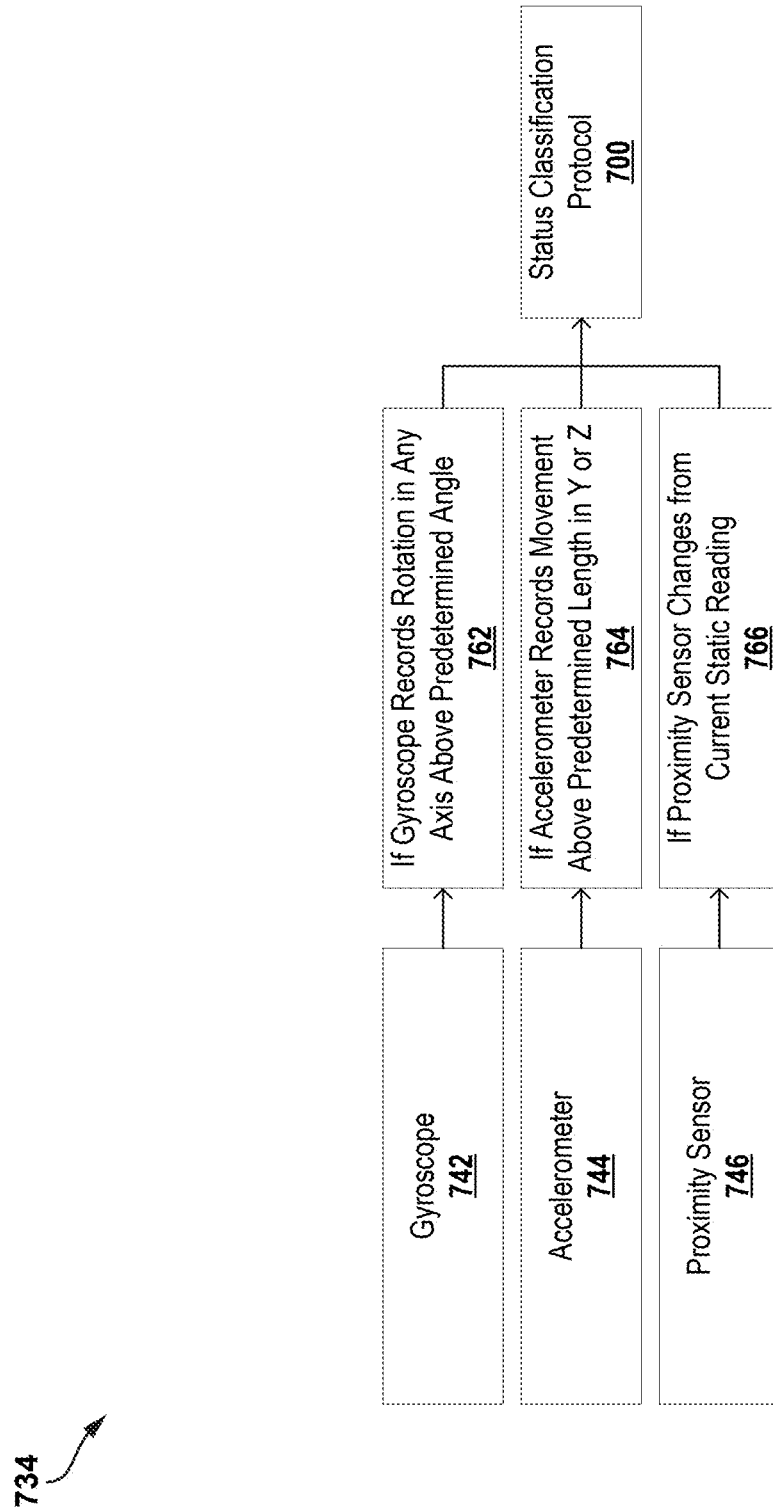
FIG. 7C is an illustration of a sensor activation protocol, according to example embodiments.

FIG. 7C is an illustration of a sensor activation protocol 734, according to example embodiments. The sensor activation protocol 734 may be performed by the monitoring device 300 when the monitoring device 300 determines that a tool is dormant 724. As illustrated, the sensor activation protocol 734 may include the monitoring device 300 receiving sensor readings from a gyroscope (e.g., an IMU) 742. If the gyroscope sensor readings indicate that the rotation in any axis is above a predetermined angle 762 (e.g., above one degree, above two degrees, above three degrees, above four degrees, above five degrees, etc.), the monitoring device 300 may return to performing the sensor classification protocol 700 shown and described with reference to FIG. 7A. The sensor activation protocol 734 may also include the monitoring device 300 receiving sensor readings from an accelerometer 744. If the accelerometer sensor readings indicate movement above a predetermined length in a y-axis or in a z-axis 754 (e.g., over 5 cm, over 10 cm, over 15 cm, over 20 cm, over 25 cm, etc.), the monitoring device 300 may return to performing the sensor classification protocol 700 shown and described with reference to FIG. 7A. Further, the sensor activation protocol 734 may also include the monitoring device 300 receiving sensor readings from a proximity sensor 746. If the proximity sensor's sensor readings change from a static reading 766, the monitoring device 300 may return to performing the sensor classification protocol 700 shown and described with reference to FIG. 7A.

Figure 7D:
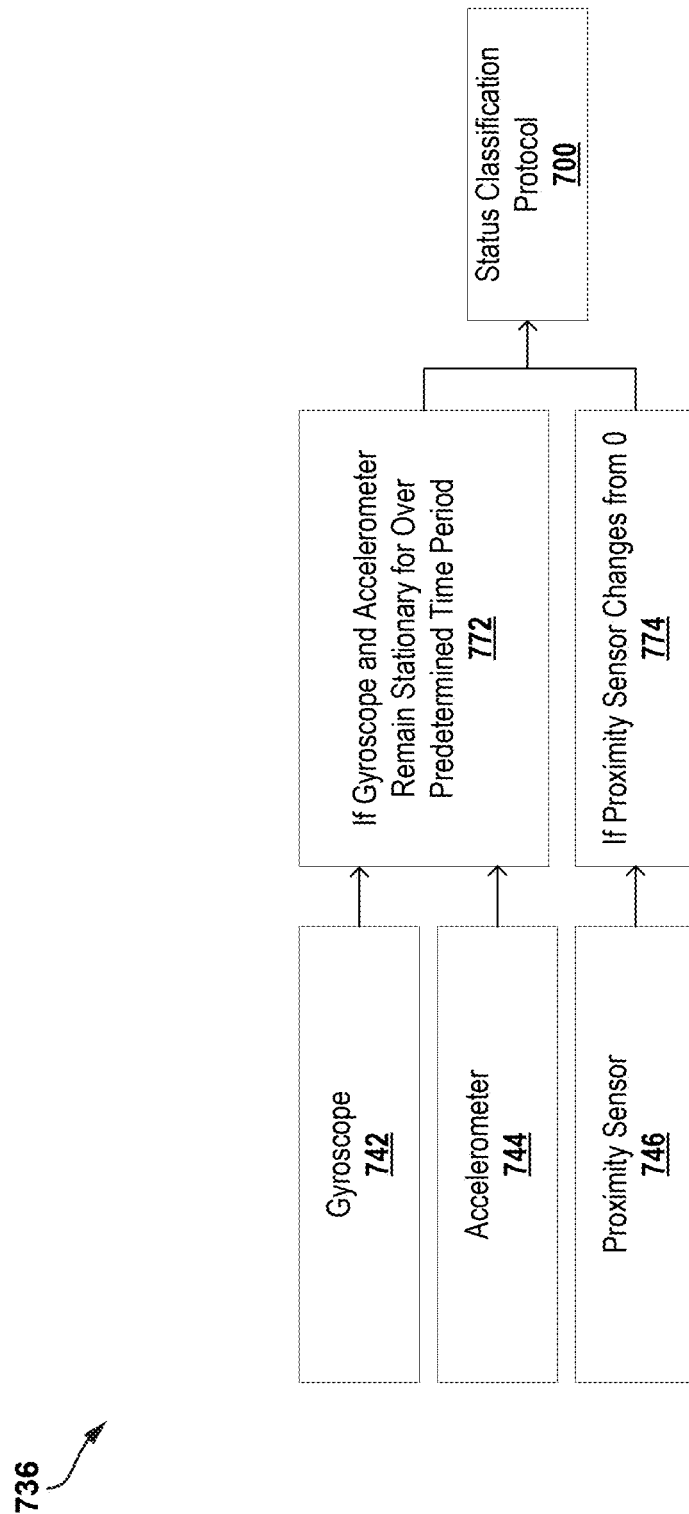
FIG. 7D is an illustration of a sensor activation protocol, according to example embodiments.

FIG. 7D is an illustration of a sensor activation protocol 736, according to example embodiments. The sensor activation protocol 736 may be performed by the monitoring device 300 when the monitoring device 300 determines that a tool is in transit 726. As illustrated, the sensor activation protocol 736 may include the monitoring device 300 receiving sensor readings from a gyroscope (e.g., an IMU) 742 and sensor readings from an accelerometer 744. If the gyroscope and the accelerometer sensor readings both remain stationary for over a predetermined time period 772 (e.g., over 1 minute, over 2 minutes, over 3 minutes, over 4 minutes, over 5 minutes, etc.), the monitoring device 300 may return to performing the sensor classification protocol 700 shown and described with reference to FIG. 7A. Further, the sensor activation protocol 736 may also include the monitoring device 300 receiving sensor readings from a proximity sensor 746. If the proximity sensor's sensor readings change from a 0 reading 774, the monitoring device 300 may return to performing the sensor classification protocol 700 shown and described with reference to FIG. 7A.

Figure 7E:
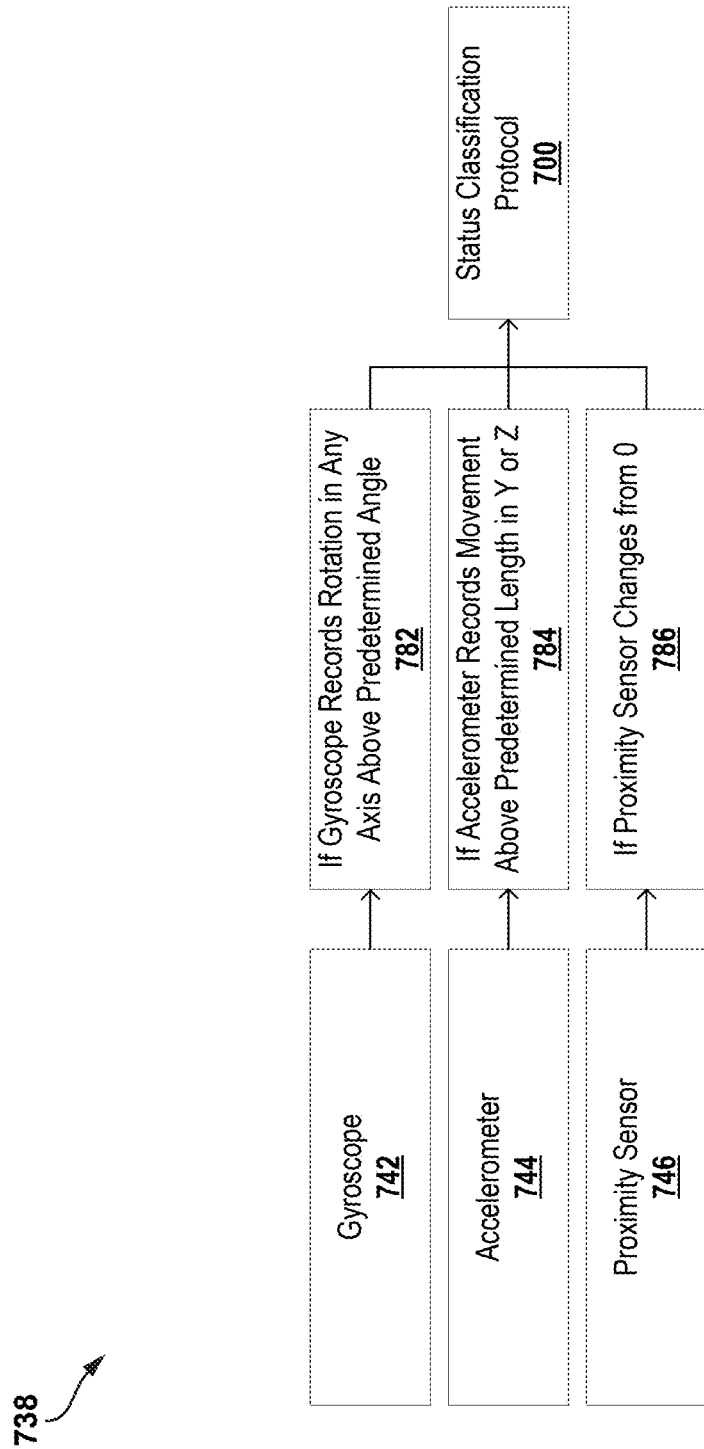
FIG. 7E is an illustration of a sensor activation protocol, according to example embodiments.

FIG. 7E is an illustration of a sensor activation protocol 738, according to example embodiments. The sensor activation protocol 738 may be performed by the monitoring device 300 when the monitoring device 300 determines that a tool is in storage 728. As illustrated, the sensor activation protocol 738 may include the monitoring device 300 receiving sensor readings from a gyroscope (e.g., an IMU) 742. If the gyroscope sensor readings indicate that the rotation in any axis is above a predetermined angle 782 (e.g., above one degree, above two degrees, above three degrees, above four degrees, above five degrees, etc.), the monitoring device 300 may return to performing the sensor classification protocol 700 shown and described with reference to FIG. 7A. The sensor activation protocol 738 may also include the monitoring device 300 receiving sensor readings from an accelerometer 744. If the accelerometer sensor readings indicate movement above a predetermined length in a y-axis or in a z-axis 784 (e.g., over 5 cm, over 10 cm, over 15 cm, over 20 cm, over 25 cm, etc.), the monitoring device 300 may return to performing the sensor classification protocol 700 shown and described with reference to FIG. 7A. Further, the sensor activation protocol 738 may also include the monitoring device 300 receiving sensor readings from a proximity sensor 746. If the proximity sensor's sensor readings change from a 0 reading 786, the monitoring device 300 may return to performing the sensor classification protocol 700 shown and described with reference to FIG. 7A.

III. Example Processes

Figure 8:
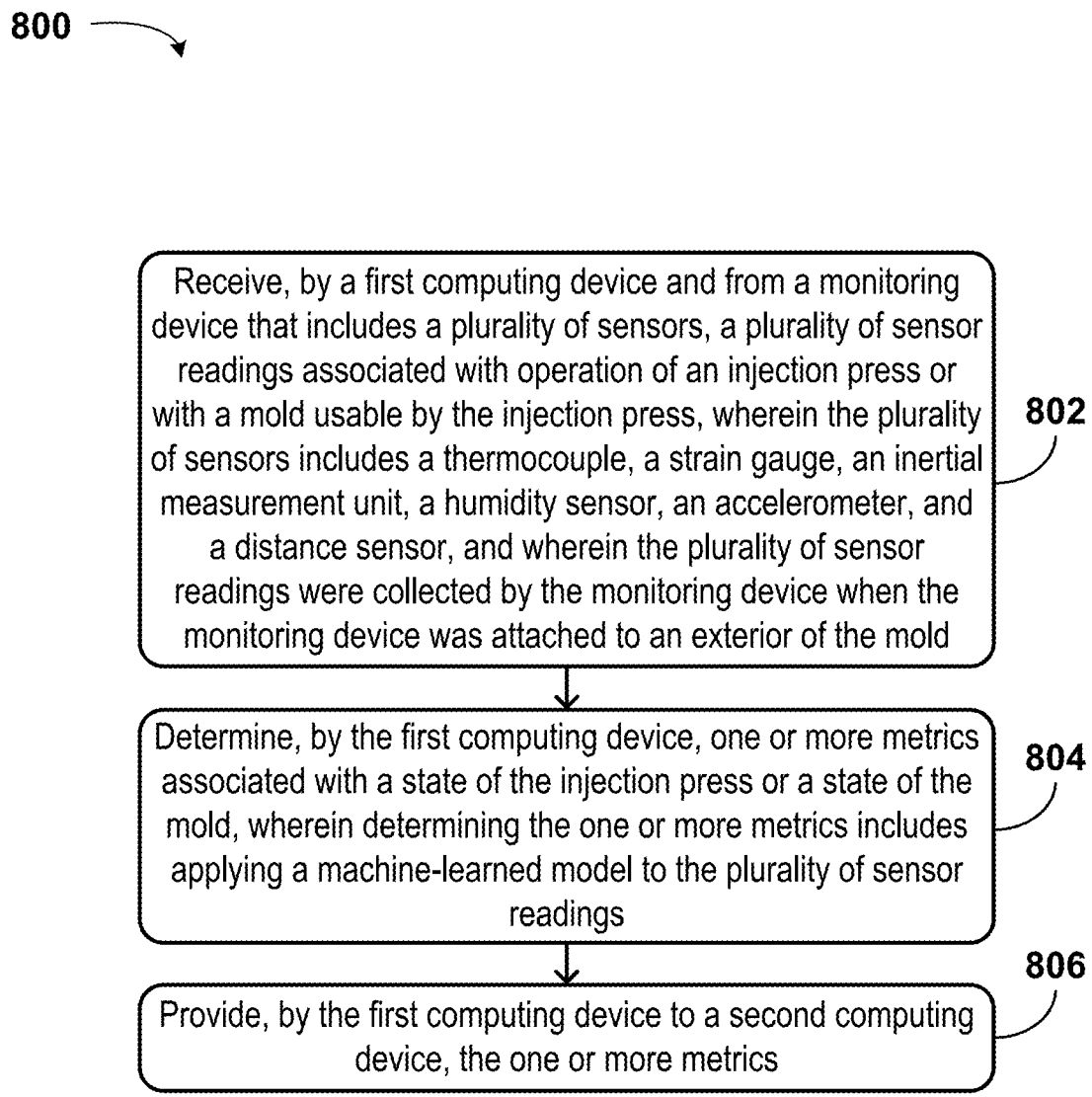
FIG. 8 is a flowchart diagram illustrating a method, according to example embodiments.

FIG. 8 is a flowchart diagram illustrating a method 800, according to example embodiments. In some embodiments, the method 800 may be performed by a system (e.g., the system 400 shown and described with reference to FIG. 4A).

At block 802, the method 800 may include receiving, by a first computing device and from a monitoring device that includes a plurality of sensors, a plurality of sensor readings associated with operation of an injection press or with a mold usable by the injection press, wherein the plurality of sensors includes a thermocouple, a strain gauge, an inertial measurement unit, a humidity sensor, an accelerometer, and a distance sensor, and wherein the plurality of sensor readings were collected by the monitoring device when the monitoring device was attached to an exterior of the mold.

At block 804, the method 800 may include determining, by the first computing device, one or more metrics associated with a state of the injection press or a state of the mold, wherein determining the one or more metrics includes applying a machine-learned model to the plurality of sensor readings.

At block 806, the method 800 may include providing, by the first computing device to a second computing device, the one or more metrics.

In some embodiments, the method 800 may also include determining, by the first computing device based on the one or more metrics, one or more adjustments to the operation of the injection press or one or more modifications to the mold. Further, the method 800 may include providing, by the first computing device to the monitoring device: the one or more adjustments to the operation of the injection press, where the one or more adjustments may be usable by the monitoring device to initiate an adjustment to the operation of the injection press; or the one or more modifications to the mold, where the one or more modifications to the mold may be usable by the monitoring device to initiate a modification to the mold.

In some embodiments of the method 800, the one or more metrics may be indicative of: material fatigue of one or more components of the mold; an aberration in a behavior of the injection press or the mold; a prescribed interval between maintenance events for the mold; a state of degradation of one or more components of the mold; a vibrational fingerprint of the mold during the operation of the injection press; or sounds associated with the mold during operation of the injection press.

In some embodiments, the method 800 may also include storing, by the first computing device, the one or more metrics in one or more databases. Additionally, the method 800 may include receiving, by the first computing device from the second computing device, a request to access the one or more metrics, where the request may include one or more authentication credentials. Further, the method 800 may include comparing, by the first computing device, the one or more authentication credentials to a list of authentication credentials for which access to information associated with the injection press or the mold is permitted.

In such embodiments, the method 800 may also include determining, by the first computing device, one or more statuses associated with the mold, where the one or more statuses may include an on status, a dormant status, a maintenance status, a transit status, an in-storage status, a cycle count, a predicted maintenance interval, a mold temperature profile, a mold load profile, a mold crash, a mold component failure, a mold seized, a mold health, or an adjustment to a process parameter. Additionally, the method 800 may include providing, by the first computing device to the second computing device, the one or more statuses.

In some embodiments of the method 800, the monitoring device may include a controller and an on-board memory. The controller may be configured to determine, based on the plurality of sensor readings, whether an ejection event has occurred. In addition, the controller may be configured to, when an ejection event has occurred, modify a sampling rate used to sample the plurality of sensors or a storage protocol associated with storing the plurality of sensor readings within the on-board memory; or provide, to the first computing device, an indication that an ejection event has occurred, where the indication may be usable by the first computing device in determining the one or more metrics associated with the state of the injection press or the state of the mold.

In some embodiments of the method 800, the one or more metrics may include a tool health index representative of a current condition of the mold. Further, block 806 may include providing a plurality of historical values of the tool health index to the second computing device.

In some embodiments of the method 800, the plurality of sensor readings may be captured at a first point time. Additionally, the method 800 may include receiving, by the first computing device and from the monitoring device, a plurality of additional sensor readings associated with operation of the injection press or with the mold at a second point in time. Further, the one or more metrics may include an estimation of a next required maintenance. In addition, block 804 may include applying the machine-learned model to the plurality of sensor readings and the plurality of additional sensor readings.

In some embodiments of the method 800, block 806 may include providing a maintenance alert to the second computing device; scheduling a maintenance time; dispatching a service technician to perform maintenance on the injection press or the mold; providing a stock keeping unit (SKU) number for a replacement part or a replacement mold to the second computing device; providing the replacement part or the replacement mold; re-routing a planned delivery; scheduling production using a different injection press than the injection press or using a different mold than the mold; scheduling production at a different fabrication facility than a fabrication facility at which the injection press or the mold is located; or providing a prompt to obtain the replacement part or the replacement mold.

In some embodiments of the method 800, the one or more metrics may include an expected count of parts made using the injection press or the mold; or an expected delivery date for parts made using the injection press or the mold.

In some embodiments of the method 800, block 806 may include providing a suggested intervention for the injection press or the mold.

In some embodiments of the method 800, the monitoring device may include a housing, a power source, and a display. Additionally, the monitoring device may be configured to display the plurality of sensor readings or the one or more metrics on the display.

In some embodiments of the method 800, the machine-learned model may include a support vector machine. Additionally or alternatively, the first computing device may provide the one or more metrics to the second computing device via a browser-based app or a mobile app.

In some embodiments, the method 800 may also include receiving, by the first computing device and from a secondary monitoring device that includes a secondary plurality of sensors, a secondary plurality of sensor readings associated with operation of a secondary injection press or with a secondary mold usable by the secondary injection press, where the secondary plurality of sensors may include a secondary thermocouple, a secondary strain gauge, a secondary inertial measurement unit, a secondary humidity sensor, a secondary accelerometer, and a secondary distance sensor, and where the secondary plurality of sensor readings may have been captured by the secondary monitoring device when the secondary monitoring device was attached to an exterior of the secondary mold. Additionally, the method 800 may include determining, by the first computing device, one or more secondary metrics associated with a fleet of injection presses or a fleet of molds based on the plurality of sensor readings and the second plurality of sensor readings, where the fleet of injection presses may include the injection press and the secondary injection press, and where the fleet of molds may include the mold and the secondary mold. Further, the method 800 may include providing, by the first computing device to the second computing device or a third computing device, the one or more secondary metrics.

In some embodiments of the method 800, block 804 may include providing a time of day, upcoming scheduled operators, scheduled operations, predicted upcoming operating conditions, or predicted upcoming weather events as inputs to the machine-learned model.

In some embodiments of the method 800, the machine-learned model may have been trained to be used for molds of a same material and a same design as the mold. Additionally, the machine-learned model may have been trained using training data that includes: a plurality of sensor readings recorded by the plurality of sensors in the monitoring device during one or more tryout runs conducted for molds of the same material and the same design as the mold; injection press parameters associated with an operation of the injection press or with molds during the one or more tryout runs conducted for molds of the same material and the same design as the mold; and a material of the mold, a design of the mold, or a design of a part to be fabricated from the mold.

In some embodiments of the method 800, the injection press parameters may include one or more measurements associated with the injection press or the mold while the injection press performed an injection molding process using the mold, and the one or more measurements may include a mold open distance, a mold open velocity, a mold close distance, a mold close velocity, an ejector back position, an ejector back velocity, an ejector forward position, an ejector forward velocity, a number of ejection strokes, a mold temperature, an injection shot size, an injection decompression, an injection screw start position, an injection transfer position, an injection velocity, an inject time, a transfer pressure, a pack pressure, a pack time, a hold pressure, a hold time, a pack velocity, a peak pressure, a cushion complete, a recovery back pressure, a screw rotation, a plastication, a cool time, or a cycle time.

In some embodiments of the method 800, block 804 may include identifying deviations between the plurality of sensor readings and a plurality of sensor readings collected during one or more tryout runs.

Figure 9:
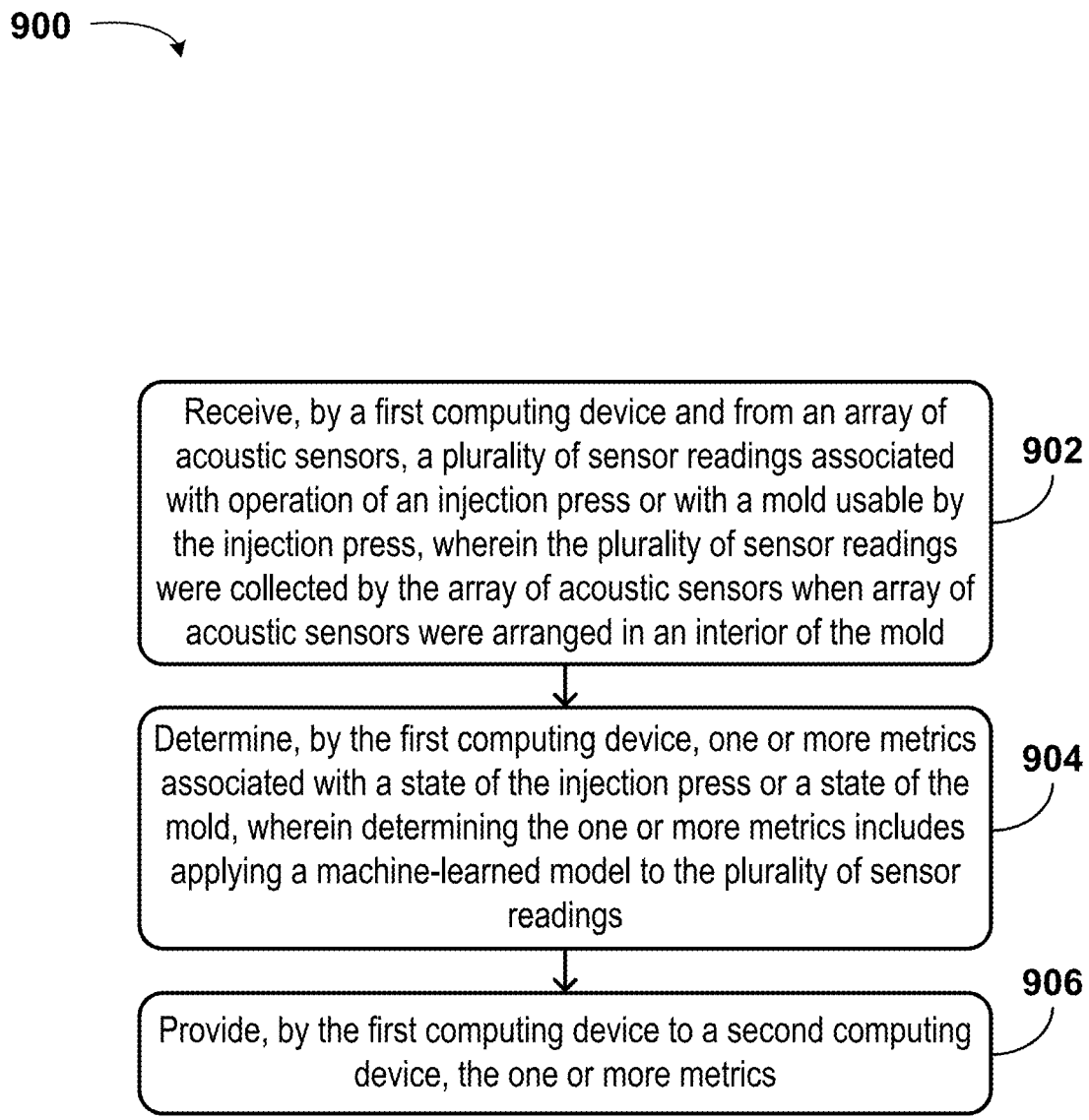
FIG. 9 is a flowchart diagram illustrating a method, according to example embodiments.

FIG. 9 is a flowchart diagram illustrating a method 900, according to example embodiments. In some embodiments, the method 900 may be performed by a system (e.g., the system 400 shown and described with reference to FIG. 4A).

At block 902, the method 900 may include receiving, by a first computing device and from an array of acoustic sensors, a plurality of sensor readings associated with operation of an injection press or with a mold usable by the injection press, wherein the plurality of sensor readings were collected by the array of acoustic sensors when array of acoustic sensors were arranged in an interior of the mold.

At block 904, the method 900 may include determining, by the first computing device, one or more metrics associated with a state of the injection press or a state of the mold, wherein determining the one or more metrics includes applying a machine-learned model to the plurality of sensor readings.

At block 906, the method 900 may include providing, by the first computing device to a second computing device, the one or more metrics.

In some embodiments of the method 900, the one or more metrics may include which plates of the mold or which portions of which plates of the mold are experiencing cycle anomalies.

IV. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. Aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

The computer-readable medium can also include non-transitory computer-readable media such as computer-readable media that store data for short periods of time like register memory and processor cache. The computer-readable media can further include non-transitory computer-readable media that store program code and/or data for longer periods of time. Thus, the computer-readable media may include secondary or persistent long term storage, like ROM, optical or magnetic disks, solid state drives, compact-disc read only memory (CD-ROM), for example. The computer-readable media can also be any other volatile or non-volatile storage systems. A computer-readable medium can be considered a computer-readable storage medium, for example, or a tangible storage device.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. Other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed:

1. A method comprising:
   receiving, by a first computing device and from a monitoring device comprising a plurality of sensors, a plurality of sensor readings associated with a mold usable by an injection press;
   determining, by the first computing device, one or more metrics associated with a state of the mold;
   providing, by the first computing device to a second computing device, the one or more metrics;
   adjusting injection press parameters of a future injection molding operation across a fleet of molds in response to the one or more metrics, wherein the fleet of molds comprises the mold usable by the injection press and a secondary mold usable by a secondary injection press;
   receiving, by the first computing device and from a secondary monitoring device comprising a secondary plurality of sensors, a secondary plurality of sensor readings associated with the secondary mold usable by the secondary injection press;
   determining, by the first computing device, one or more secondary metrics associated with the fleet of molds based on the plurality of sensor readings and the second plurality of sensor readings;
   providing, by the first computing device to the second computing device or a third computing device, the one or more secondary metrics; and
   further adjusting the injection press parameters of the future injection molding operation across the fleet of molds in response to the one or more secondary metrics.

2. The method of claim 1, further comprising:
   determining, by the first computing device based on the one or more metrics, one or more modifications to the mold; and
   providing, by the first computing device to the monitoring device,
      the one or more modifications to the mold, wherein the one or more modifications to the mold are usable by the monitoring device to initiate a modification to the mold.

3. The method of claim 1, wherein the one or more metrics are indicative of:
   material fatigue of one or more components of the mold;
   an aberration in a behavior of the mold;
   a prescribed interval between maintenance events for the mold;
   a state of degradation of one or more components of the mold;
   a vibrational fingerprint of the mold; or
   sounds associated with the mold.

4. The method of claim 1, further comprising:
storing, by the first computing device, the one or more metrics in one or more databases;
receiving, by the first computing device from the second computing device, a request to access the one or more metrics, wherein the request comprises one or more authentication credentials; and
comparing, by the first computing device, the one or more authentication credentials to a list of authentication credentials for which access to information associated with the injection press or the mold is permitted.

5. The method of claim 1, further comprising:
determining, by the first computing device, one or more statuses associated with the mold, wherein the one or more statuses comprise an on status, a dormant status, a maintenance status, a transit status, an in-storage status, a cycle count, a predicted maintenance interval, a mold temperature profile, a mold load profile, a mold crash, a mold component failure, a mold seized, a mold health, or an adjustment to a process parameter; and
providing, by the first computing device to the second computing device, the one or more statuses.

6. The method of claim 1,
wherein the monitoring device comprises a controller and an on-board memory, and
wherein the controller is configured to:
determine, based on the plurality of sensor readings, whether an ejection event has occurred; and
when an ejection event has occurred:
modify a sampling rate used to sample the plurality of sensors or a storage protocol associated with storing the plurality of sensor readings within the on-board memory; or
provide, to the first computing device, an indication that an ejection event has occurred, wherein the indication is usable by the first computing device in determining the one or more metrics associated with the state of the mold.

7. The method of claim 1,
wherein the one or more metrics comprises a tool health index representative of a current condition of the mold, and
wherein the providing of the one or more metrics to the second computing device comprises providing a plurality of historical values of the tool health index to the second computing device.

8. The method of claim 1,
wherein the plurality of sensor readings is captured at a first point time,
wherein the method further comprises receiving, by the first computing device and from the monitoring device, a plurality of additional sensor readings associated with the mold at a second point in time,
wherein the one or more metrics comprise an estimation of a next required maintenance, and
wherein the determining, by the first computing device, of the estimation of the next required maintenance comprises applying a machine-learned model to the plurality of sensor readings and the plurality of additional sensor readings.

9. The method of claim 1, wherein providing, by the first computing device to the second computing device, the one or more metrics comprises:
providing a maintenance alert to the second computing device;
scheduling a maintenance time;
dispatching a service technician to perform maintenance on the mold;
providing a stock keeping unit (SKU) number for a replacement part or a replacement mold to the second computing device;
providing the replacement part or the replacement mold;
re-routing a planned delivery;
scheduling production using a different mold than the mold;
scheduling production at a different fabrication facility than a fabrication facility at which the injection press or the mold is located; or
providing a prompt to obtain the replacement part or the replacement mold.

10. The method of claim 1, wherein the one or more metrics comprise:
an expected count for parts made using the mold; or
an expected delivery date for parts made using the mold.

11. The method of claim 1, further comprising tuning, by the first computing device, the second computing device, or the third computing device, a future injection molding process of the injection press or the secondary injection press based on the one or more secondary metrics associated with the fleet of molds.

12. The method of claim 1,
wherein the monitoring device further comprises a housing, a power source, and a display, and
wherein the monitoring device is configured to display the plurality of sensor readings or the one or more metrics on the display.

13. The method of claim 1, wherein the determining, by the first computing device, of the one or more metrics associated with the state of the mold comprises applying a support vector machine to the plurality of sensor readings, or wherein the first computing device provides the one or more metrics to the second computing device via a browser-based application or a mobile application.

14. The method of claim 1, further comprising determining, by the first computing device, one or more changes in a production process based on the one or more metrics or the one or more secondary metrics, wherein the one or more changes in the production process comprise:
dispatching a service technician to perform maintenance on the mold or the secondary mold;
obtaining replacement parts for the mold or the secondary mold; or
re-routing a delivery associated with the mold or the secondary mold.

15. The method of claim 1, wherein the determining, by the first computing device, of the one or more metrics associated with the state of the mold comprises applying a machine-learned model to the plurality of sensor readings, and wherein the applying of the machine-learned model to the plurality of sensor readings comprises providing a time of day, upcoming scheduled operators, scheduled operations, predicted upcoming operating conditions, or predicted upcoming weather events as inputs to the machine-learned model.

16. The method of claim 1,
wherein the determining, by the first computing device, of the one or more metrics associated with the state of the mold comprises applying a machine-learned model to the plurality of sensor readings,
wherein the machine-learned model has been trained to be used for molds of a same material and a same design as the mold, and wherein the machine-learned model is trained using training data comprising:
- a plurality of sensor readings recorded by the plurality of sensors in the monitoring device during one or more tryout runs conducted for molds of the same material and the same design as the mold;
- the injection press parameters associated with molds during the one or more tryout runs conducted for molds of the same material and the same design as the mold; and
- a material of the mold, a design of the mold, or a design of a part to be fabricated from the mold.

17. The method of claim 16, wherein the injection press parameters comprise one or more measurements associated with the mold while the injection press performed an injection molding process using the mold, and wherein the one or more measurements comprise a mold open distance, a mold open velocity, a mold close distance, a mold close velocity, an ejector back position, an ejector back velocity, an ejector forward position, an ejector forward velocity, a number of ejection strokes, a mold temperature, an injection shot size, an injection decompression, an injection screw start position, an injection transfer position, an injection velocity, an inject time, a transfer pressure, a pack pressure, a pack time, a hold pressure, a hold time, a pack velocity, a peak pressure, a cushion complete, a recovery back pressure, a screw rotation, a plastication, a cool time, or a cycle time.

18. The method of claim 1, wherein the determining, by the first computing device, of the one or more metrics associated with the state of the mold comprises applying a machine-learned model to the plurality of sensor readings, and wherein the applying of the machine-learned model to the plurality of sensor readings comprises identifying deviations between the plurality of sensor readings and a plurality of sensor readings collected during one or more tryout runs.

19. A monitoring device comprising:
- a plurality of sensors configured to collect a plurality of sensor readings associated with a mold usable by an injection press; and
- a controller configured to provide the plurality of sensor readings to a first computing device, wherein the first computing device is configured to:
  - determine one or more metrics associated with a state of the mold;
  - provide the one or more metrics to a second computing device;
  - adjust injection press parameters of a future injection molding operation across a a fleet of molds in response to the one or more metrics, wherein the fleet of molds comprises the mold usable by the injection press and a secondary mold usable by a secondary injection press;
  - receive, from a secondary monitoring device comprising a secondary plurality of sensors, a secondary plurality of sensor readings associated with the secondary mold usable by the secondary injection press;
  - determine one or more secondary metrics associated with the fleet of molds based on the plurality of sensor readings and the second plurality of sensor readings;
  - provide, to the second computing device or a third computing device, the one or more secondary metrics; and
  - further adjust the injection press parameters of the future injection molding operation across the fleet of molds in response to the one or more secondary metrics.

20. A system comprising:
- a mold usable by an injection press;
- a first computing device;
- a monitoring device attached to the mold, wherein the monitoring device comprises:
  - a plurality of sensors configured to collect a plurality of sensor readings associated with the mold; and
  - a controller configured to provide the plurality of sensor readings to the first computing device; and
- a secondary monitoring device, wherein the secondary monitoring device comprises:
  - a second plurality of sensors configured to collect a secondary plurality of sensor readings associated with a secondary mold usable by a secondary injection press; and
  - a secondary controller configured to provide the secondary plurality of sensor readings to the first computing device, wherein the first computing device is configured to:
- determine one or more metrics associated with a state of the mold;
- provide the one or more metrics to a second computing device;
- adjust injection press parameters of a future injection molding operation across a a fleet of molds in response to the one or more metrics, wherein the fleet of molds comprises the mold usable by the injection press and the secondary mold usable by the secondary injection press;
- determine one or more secondary metrics associated with the fleet of molds based on the plurality of sensor readings and the second plurality of sensor readings;
- provide, to the second computing device or a third computing device, the one or more secondary metrics; and
- further adjust the injection press parameters of the future injection molding operation across the fleet of molds in response to the one or more secondary metrics.

* * * * *